US011303856B1

(12) United States Patent
Carter

(10) Patent No.: US 11,303,856 B1
(45) Date of Patent: *Apr. 12, 2022

(54) SECURITY ENTRY AND DELIVERY SYSTEM AND METHOD OF USING SAME

(71) Applicant: 1AHEAD Technologies, Charlotte, NC (US)

(72) Inventor: Ronald Carter, Matthews, NC (US)

(73) Assignee: 1AHEAD Technologies, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,278

(22) Filed: Sep. 28, 2021

Related U.S. Application Data

(63) Continuation-in-part of application No. PCT/US2021/039812, filed on Jun. 30, 2021, and a
(Continued)

(51) Int. Cl.
*H04N 7/18* (2006.01)
*G10L 15/26* (2006.01)
(Continued)

(52) U.S. Cl.
CPC ........... *H04N 7/186* (2013.01); *B64C 39/024* (2013.01); *G07C 9/32* (2020.01);
(Continued)

(58) Field of Classification Search
CPC .............. H04N 7/186; G08B 13/19619; G08B 13/19639; B64C 39/024; B64C 2201/128;
(Continued)

(56) References Cited

U.S. PATENT DOCUMENTS 8,667,297 B2 3/2014 Salter et al.
9,365,188 B1 6/2016 Penilla et al.
(Continued)

FOREIGN PATENT DOCUMENTS

WO 2013174983 A1 11/2013

OTHER PUBLICATIONS

Joshi et al. "GSM Based Security Automation System for Building Entry Management." (2019). 1-52 Jun. 30, 2019 (Jun. 30, 2019) Retrieved on Sep. 3, 2021 (Sep. 3, 2021) from <https://ijsret.com/wp-contenUuploads/2019/05/IJSRET_V5_issue3_297.pdf> entire document.

*Primary Examiner* — Jared Walker
(74) *Attorney, Agent, or Firm* — Invention To Patent Services; Alex Hobson

(57) ABSTRACT

An artificial intelligence entry management device for an entry and delivery system includes a camera, a microphone, a motion detector, a speaker, and a housing. The housing has an oval shape with a substantially open middle. The substantially open middle has a housing protrusion portion configured to house the camera, the microphone, the motion detector, and the speaker. The entry and delivery system may also include one or more robots that interface with the entry management device to monitor an area around an access point and to alert the user of activity. A robot may be an aerial robot that has a camera, a robot light, a speaker, a microphone and an actuator to enable picking and moving a package. Aerial robots may be configured around a perimeter of a building to monitor the building and may turn on a robot light when motion is detected.

33 Claims, 13 Drawing Sheets

Related U.S. Application Data continuation-in-part of application No. 17/469,863, filed on Sep. 8, 2021, application No. PCT/US2021/039812, filed on Jun. 30, 2021, which is a continuation of application No. 17/070,739, filed on Oct. 14, 2020, now Pat. No. 11,128,840, and a continuation of application No. 17/363,262, filed on Jun. 30, 2021, now Pat. No. 11,151,825, which is a continuation-in-part of application No. 17/070,739, filed on Oct. 14, 2020, now Pat. No. 11,128,840, application No. 17/488,278, filed on Sep. 28, 2021, which is a continuation-in-part of application No. 17/363,262, filed on Jun. 30, 2021, now Pat. No. 11,151,825.

(60) Provisional application No. 63/228,433, filed on Aug. 2, 2021, provisional application No. 63/239,934, filed on Sep. 1, 2021.

(51) Int. Cl.
  *H04L 9/32* (2006.01)
  *G08B 13/196* (2006.01)
  *G07C 9/32* (2020.01)
  *G07C 9/00* (2020.01)
  *B64C 39/02* (2006.01)

(52) U.S. Cl.
  CPC . *G08B 13/19619* (2013.01); *G08B 13/19639* (2013.01); *G10L 15/26* (2013.01); *H04L 9/3263* (2013.01); *B64C 2201/128* (2013.01); *G07C 2009/0092* (2013.01)

(58) Field of Classification Search
  CPC . G07C 9/32; G07C 2009/0092; H04L 9/3263; G10L 15/26
  See application file for complete search history.

(56) References Cited

U.S. PATENT DOCUMENTS

| | | | |
|---|---|---|---|
| 9,499,128 | B2 | 11/2016 | Reh et al. |
| 9,508,207 | B2 | 11/2016 | Kalb et al. |
| 9,608,970 | B1 | 3/2017 | Gehret et al. |
| 9,640,040 | B2 | 5/2017 | Irudayam et al. |
| 9,646,165 | B1 | 5/2017 | Saylor |
| 9,805,534 | B2 | 10/2017 | Ho et al. |
| 9,842,447 | B2 | 12/2017 | Badger, II |
| 9,870,698 | B2 | 1/2018 | Rabb et al. |
| 9,911,290 | B1 | 3/2018 | Zalewski et al. |
| 9,922,513 | B1 | 3/2018 | Hall et al. |
| 9,923,879 | B1 | 3/2018 | Ziraknejad et al. |
| 9,978,238 | B2 | 5/2018 | Fadell et al. |
| 10,043,332 | B2 | 8/2018 | Scalisi et al. |
| 10,147,249 | B1 | 12/2018 | Brady et al. |
| 2005/0007451 | A1* | 1/2005 | Chiang ........... G08B 13/19634 348/143 |
| 2006/0091206 | A1 | 5/2006 | Olsen et al. |
| 2007/0103548 | A1* | 5/2007 | Carter ................. H04N 7/185 348/143 |
| 2008/0036862 | A1* | 2/2008 | Lang .................. H04N 7/181 348/156 |
| 2008/0239072 | A1* | 10/2008 | Cheng ............. G08B 13/19619 348/143 |
| 2011/0248818 | A1 | 10/2011 | Hashim-Waris |
| 2013/0017812 | A1 | 1/2013 | Foster |
| 2013/0169802 | A1* | 7/2013 | Chen ................... H04N 5/2254 348/143 |
| 2014/0035721 | A1 | 2/2014 | Heppe et al. |
| 2014/0267716 | A1* | 9/2014 | Child ................. H04N 7/186 348/143 |
| 2014/0274013 | A1 | 9/2014 | Santavicca |
| 2014/0373111 | A1 | 12/2014 | Moss et al. |
| 2015/0022620 | A1* | 1/2015 | Siminoff ............. H04N 7/186 348/14.02 |
| 2015/0156031 | A1* | 6/2015 | Fadell ................ G08B 19/005 700/276 |
| 2016/0219254 | A1* | 7/2016 | Hu ..................... H04N 7/186 |
| 2017/0019700 | A1* | 1/2017 | Tseng ................. H04N 7/186 |
| 2017/0076520 | A1* | 3/2017 | Ho .................... G07C 9/00309 |
| 2017/0249794 | A1 | 8/2017 | Davis |
| 2018/0191930 | A1* | 7/2018 | Jeong ................. H04N 5/2252 |
| 2019/0016511 | A1* | 1/2019 | Yang .................. B65D 55/14 |
| 2020/0035050 | A1 | 1/2020 | Darter |

* cited by examiner

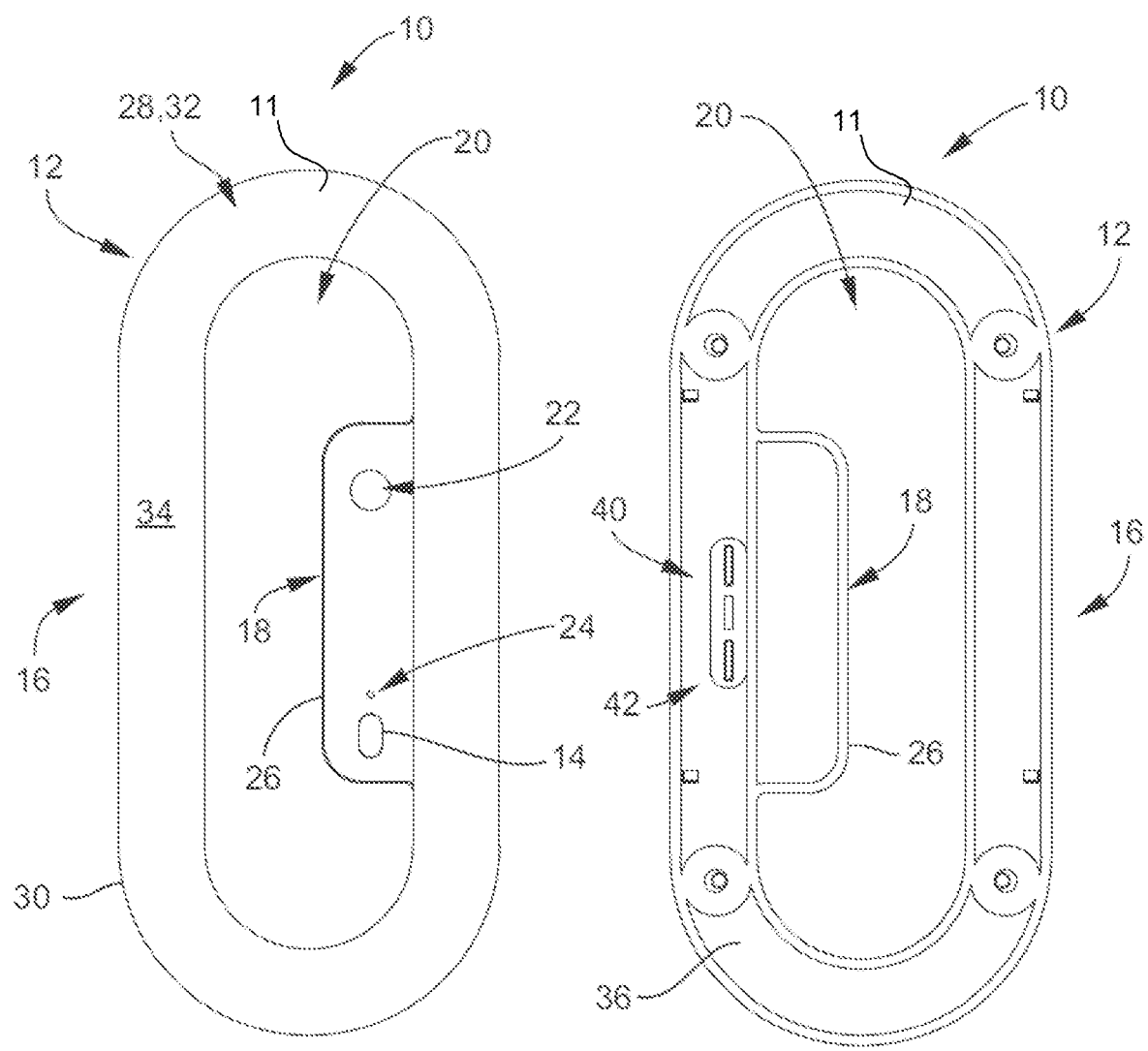

SECURITY ENTRY AND DELIVERY SYSTEM AND METHOD OF USING SAME

CROSS REFERENCE TO RELATED APPLICATIONS

This application is a continuation in part of U.S. application No. 17/469,863, filed on. Sep. 8, 2021, which is a continuation in part of PCT application No. US2021/039812, filed on Jun. 30, 2021, which claims priority to U.S. patent application Ser. No. 17/070,739, filed on Oct. 14, 2020 and now issued as U.S. Pat. No. 11,128,840 on Sep. 21, 2021, and to U.S. application No. 17/363,363 filed on Jun. 30, 2021, which is a continuation in part of Ser. No. 17/070,739, and this application also claims the benefit of priority to U.S. provisional patent application No. 63/228,433, filed on Aug. 2, 2021, the entirety of all applications are hereby incorporated by reference herein.

FIELD OF THE INVENTION

The present disclosure relates to security systems and delivery methods. More specifically, the present disclosure relates to an artificial intelligence ("AI") entry management device, system, and method of using the same.

BACKGROUND

Many consumers today purchase goods on the Internet from online retailers, and this form of shopping is expected to increase in the years to come. This form of shopping, which has become commonplace, requires the purchased goods to be shipped to the purchaser. Often, the goods are packaged and delivered to the residence of the purchaser while the purchaser is not home, and the packaged goods are merely left unsecured by the door of the purchaser's residence. Of course, such packages are prone to being stolen, resulting in significant financial loss to someone in the online retailer chain.

Therefore, a need exists for improved entry management systems and methods of use thereof.

SUMMARY

Therefore, one object of the present disclosure may be to provide an artificial intelligence entry management device for an entry management system. The artificial intelligence entry management device may include a camera, a microphone, a motion detector, a speaker, and a housing. The housing may have an oval shape with a substantially open middle or be solid within the oval shape. The substantially open middle may have a housing protrusion portion configured to house the camera, the microphone, the motion detector, and the speaker. An artificial intelligence entry management device or artificial intelligence entry management system, as described herein, may be part of a smart-home device that may have other functions, such as opening other entry points to a property or building, turning on lights, setting temperature for a heating or air conditioning system and the like.

In select embodiments of the disclosed artificial intelligence entry management device, a plurality of lights may be included. The plurality of lights may be positioned around a periphery of the oval shape of the housing. In select embodiments, each of the plurality of lights may be a light emitting diode. One feature may be that each of the light emitting diodes of the plurality of lights may be configured to light up based on sounds emitted from the speaker, whereby the plurality of lights may be configured to mimic the artificial intelligence entry management device as if it were talking. Another feature may be that the plurality of lights can be configured to indicate an alarm has been triggered by flashing. Another feature may be that the plurality of lights can be configured to indicate a status of the artificial intelligence entry management device.

In select embodiments of the disclosed artificial intelligence entry management device, an LED lens may be included. The LED lens may be configured to cover and protect the plurality of lights. The LED lens may have the oval shape of the housing.

In select embodiments of the disclosed artificial intelligence entry management device, a mounting bracket may be included. The mounting bracket may be configured for mounting the housing of the artificial intelligence entry management device to a surface. The mounting bracket may have the oval shape of the housing.

In select embodiments of the disclosed artificial intelligence entry management device, a power source may be included. The power source may be a hardwired power source, a battery powered power source, the like, or combinations thereof.

In select embodiments of the disclosed artificial intelligence entry management device, a wireless communication device may be included. The wireless communication device may be housed inside of the housing protrusion portion of the housing of the artificial intelligence entry management device. The wireless communication device may be configured to communicate with the entry management system or other artificial intelligence entry management devices via a wireless communication. The wireless communication of the wireless communication device may be selected from a group consisting of: Wi-Fi; UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.); the like; or combinations thereof.

One feature of the disclosed artificial intelligence entry management device may be that the speaker can be positioned in the housing protrusion portion and oriented toward the substantially open middle. This orientation of the speaker may be for projecting sound from the speaker out of the artificial intelligence entry management device.

Another feature of the disclosed artificial intelligence entry management device may be the inclusion of a processor. The processor may have a non-transitory computer readable storage medium including software. The software of the processor may have program instructions configured for providing artificial intelligence to the artificial intelligence entry management device. In select embodiments, the software may be configured for development of intelligence within the artificial intelligence entry management device, including, speech recognition, problem-solving, learning, planning, the like, combinations thereof, etc. In select embodiments of the disclosed artificial intelligence entry management device, the processor may be a networked processor. The networked processor may be connected to the artificial intelligence entry management device via a wireless communication to the wireless communication device on the artificial intelligence entry management device. In other select embodiments, the processor may be a chipped processor. The chipped processor may be housed inside of the housing protrusion portion of the housing of the artificial intelligence entry management device.

An exemplary artificial intelligence entry management system may employ an AI system similar to or including features of the Watson AI system. Watson is a supercomputer that combines artificial intelligence (AI) and sophisticated analytical software for optimal performance as a "question answering" machine. The supercomputer is named for IBM's founder, Thomas J. Watson. The Watson supercomputer processes at a rate of 80 teraflops (trillion floating-point operations per second). To replicate (or surpass) a high-functioning human's ability to answer questions, Watson accesses 90 servers with a combined data store of over 200 million pages of information, which it processes against six million logic rules. It is a platform for exploring, visualizing and presenting data that utilizes Watson's cognitive capabilities to automatically surface data-driven insights and recommend ways of presenting the data.

In another aspect, the instant disclosure embraces an artificial intelligence entry management system. The disclosed artificial intelligence entry management system may generally include utilizing the disclosed artificial intelligence entry management device in any of the various embodiments and/or combination of embodiments shown and/or described herein. As such, in general, the disclosed artificial intelligence entry management system may include the disclosed entry management device with a camera, a microphone, a motion detector, a speaker, a wireless communication device, the like, and/or combinations thereof. In addition, the disclosed artificial intelligence entry management system may include an artificial intelligence device. The artificial intelligence device may be in communication with the entry management device. The artificial intelligence device may include a processor with a non-transitory computer readable storage medium having software with program instructions configured for providing artificial intelligence to the artificial intelligence entry management device.

One feature of the disclosed artificial intelligence entry management system may be that the software may have programming instructions that, when executed, cause the entry management device to execute entry management and ecommerce support functions including the delivery of messages, directives, instructions, greetings, recordings, and facilitating the connection of a third party for two-way audio/video communication.

Another feature of the disclosed artificial intelligence entry management system may be that the motion detector of the entry management device may be configured to activate upon motion and provide a greeting, command, or instructions, whereby the system activates upon recognition of a paired mobile device. The paired mobile device may be a stored identification paired via the approval of an owner/administrator. The owner/administrator may be individuals assigned programming rights configured to allow the owner/administrator to make selections remotely via the artificial intelligence entry management system.

Another feature of the disclosed artificial intelligence entry management system may be that, when activation occurs, the artificial intelligence entry management system may be configured to provide a spontaneous response, or a pre-programmed response in accordance with the device it detects.

Another feature of the disclosed artificial intelligence entry management system may be that the artificial intelligence entry management system may be configured to provide a spontaneous response, or a pre-programed response in accordance with the image read by its camera.

Another feature of the disclosed artificial intelligence entry management system may be that, when activated, simultaneously, a notification is sent to the owner/administrator with an option to engage remotely in two-way communication, activate a preprogrammed or custom message, provide a virtual key or activate the recording for a message, detect a person or a device via the camera, the microphone, the motion detector, or the wireless communication device and provide an intelligent response to the person or device via the speaker or the wireless communication device.

The artificial intelligence entry management system may ask if a third party would like to leave a message and an audio message may be recorded via the microphone of the artificial intelligence entry management device and this message may be relayed to an administrator immediately, or upon their request to play the message, which may be one a plurality of recorded messages. The artificial intelligence entry management system may ask a third party if they would like to interface with an administrator and if and when the administrator confirms the request, a audio interface or call may be initiated between the administrator and the third party and or a video call, wherein the administrator is shown on the display screen of the artificial intelligence entry management device and the third party is shown on a display screen of the electronic device used by the administrator. An exemplary artificial intelligence entry management system may be configured to record messages for a number of administrators and a message may be indicated for only one or more than one recipient. Only the messages directed by the messenger would have access to these messages, thereby making it possible to leave a private message for a single recipient.

Another feature of the disclosed artificial intelligence entry management system may be that when a package is scanned by the camera of the entry management device, the artificial intelligence entry management system may be configured to initiate a geo-fence around an area of the entry management device, or any area that that a camera of the system can detect, like a monitored designated area (MDA) or multiple monitored designated areas (MDAs) created by the artificial entry management system in the view of the camera, or in view of multiple cameras of the artificial intelligence entry management system. Wherein, when the geo-fence or MDA is initiated, the entry management device may be configured to utilize the motion detector, camera, microphone, or combinations thereof for creating the geo-fence or MDA monitored area, having a proximity distance from the AI entry management device, for detecting a breach of the geo-fence area or MDA. In select embodiments, when a breach of the geo-fence area or MDA is detected, the artificial intelligence entry management system may be configured to: alert the owner via a wireless notification; trigger the entry management device to set off an alarm of the entry management device; trigger an external alarm; the like; and/or or combinations thereof. In select embodiments, when the package is placed in the geo-fence monitored area or MDA the entry management device, the carrier of the package can activate the entry management device to monitor the geo-fence area or MDA via the motion detector, camera, microphone, or combinations thereof. In other select embodiments, a carrier of the package can deactivate the geo-fence or MDA by scanning of the package or a virtual key, whereby the package may be retrieved, whereby the notification, alarms, or combinations thereof are deactivated by the scanning of the package or the virtual key, and a subsequent scan can reactivate the geo-fence monitored area or MDA.

An exemplary artificial intelligence entry management system may be used to collect audio-visual information that may be recorded in the event of a breach of an access point. Sensors on an access point may be coupled with the artificial intelligence entry management system and when an access point is opened without authorization from the artificial intelligence entry management system, an alarm may sound and the camera and microphone may record information for later evaluation to determine the source of the breach. For example, a video may be recorded that is later watched to identify a thief breaking into a home. Note that a motion sensor may be coupled with the artificial intelligence entry management system and video and audio may be recorded when the motion detector is activated.

Another feature of the disclosed artificial intelligence entry management system may be that the artificial intelligence device can be configured to learn various inputs. An artificial intelligence device may learn from past events and can learn to recognize or predict when a particular person may be arriving or departing from a dwelling and may produce messages or questions that correspond with a recognized person or event. The artificial intelligence entry management system may learn to associate features of a person or vehicle that can be used to verify a person or a company. For example, the artificial intelligence entry management system may use the camera to take pictures when a delivery person arrives and these pictures may be analyzed for logos, or emblems that can be used to identify a person approaching the artificial intelligence entry management device. The camera may be used to detect emblems, logos, color or uniforms, hat shapes, etc. Likewise, an exemplary artificial intelligence entry management system may be configured to detect threats including masks or a weapon, such as a gun or knife. In the event that a threat is detected, a robot, land or aerial, may be configured to record images and/or video of the threat and may be configured to follow said threat as they leave the area. A robot may be able to communicate, such as by transmitting data, video and/or audio data, position data, such as through a global positioning system (GPS) to an administrator and/or emergency authorities to aid in tracking and locating said threat, such as said third party. The artificial intelligence entry management system may control the robot without input from the administrator to record images and/or follow a threat. The robot may also have artificial intelligence embedded in the robot and act independently to recognize threats, record threat data, images and video, and/or follow a threat. A robot may also be configured to receive packages from a delivery person and they may transport the package to a secondary location, such as within a dwelling or another building, or to a storage container. The access point may be unlocked by the system for the robot deliver a package. Likewise, a robot may be configured to retrieve a package through an access point and deliver the package to a person or other robot at the location.

A robot may be a land or aerial robot, wherein the land robot moves over land and wherein the aerial robot is configured to fly. An aerial robot may have one or more propellers and a land robot may have a wheel or wheels, actuating legs or treads for movement over land. A robot may be configured with a camera to monitor an area around a dwelling or building, such as a place of business and may be instrumental in creating the geofence area. A robot may be configured to dock with a docking station wherein the robot is charged, or exchanges batteries. The docking station may be hard wired to receive electricity from the dwelling or place of business to charge the robot or the batteries for the robot, and/or the docking station may be coupled with a renewable power supply, such as a wind generator (wind turbine), or a solar generator, such as a photovoltaic cell (solar panel). The docking stations may be configured in strategic positions about the dwelling or place of business to provide effective monitoring. For example, four robots may be configured with one at each corner of the home. The robots and/or the docking stations may be configured to provide a substantially complete perimeter monitoring of the building, dwelling or place of business, wherein are least 80% or more of the perimeter is captured by a camera of the plurality of robots, or preferably 90% or more of the perimeter and even more preferably 95% or more of the perimeter. There may be cases where 100% of the perimeter is monitored and there may be overlap in the monitored area from one robot to another robot.

The robots, such as aerial robots may be configured to monitor or conduct surveillance using a camera and/or a microphone. The robot may be programmed to focus in on any movement detected above some threshold of movement, and/or follow a person entering a geofence region or area around a dwelling or access point. The robots may take images, photographs or video, of a person entering such an area. In addition, the robots may be configured with lights and these lights may be programmed to activate when motion is detected or a sound in detected. The lights may be bright lights, such as flood light, producing about 500 lumens or more, or about 500 lumens or more, about 1,000 lumens or more, about 2,500 lumens or more, about 5,000 lumens or more and any range between and including the lumens provided. In addition, the robots may be configured with a speaker that is configured to produce an alarm when an intruder is detected, such as motion above a threshold motion being detected or sound above a threshold sound being detected. The lights may be any suitable color and may flash in an alarm mode while an alarm sound is emitted from the speaker. An administrator may be able to activate the surveillance mode of the robots through a user interface of the Artificial intelligence entry management system, such as a compute or mobile device, such as a mobile phone. Also, a user may be able to activate an alarm mode to cause the robot(s) to produce flashing lights and/or an alarm sound from their speakers. An administrator may also be able to activate a light mode, wherein the lights on the robot are turned on. The robots may be aerial robots that are configured around the home and the lights on the robots may provide better visibility around the home, for example.

An exemplary artificial intelligence entry management system may include a robot, such as a land or aerial robot, that may be configured to move packages from a first location to second location, monitor a delivery location and/or communicate with people such as a delivery person. A robot may have a speaker, such as a directional speaker, to enable communication with a third party to provide a greeting and/or logistic information to a said third party. The robot may even lead the delivery person to an access point for delivering the package. An exemplary robot may be configured to take a package from a deliver person and deliver the package to an access point, such as inside a building or into a storage container. A directional speaker may enable communication with a third party with some level of privacy, wherein only the person the speaker is directed at can effectively hear the communication. Also, a directional speaker may enable effective communication from an aerial robot wherein the communication, such as logistic instructions, can be effective heard by a third party over noise made by the aerial robot from the propellers, for example. An administrator or authorities may be able to communicate through a speaker on the robot. A robot may be configured to pick up a delivery package using a package manipulator and deliver the package to a deliver location, which may be a storage container or a secondary location such as to a back porch or fenced in area for added security. In an exemplary embodiment, an aerial robot may guide or direct a delivery person to a delivery location. An aerial robot may be used for monitoring a delivery location and may provide input to a geofence or MDA and may provide input to the exemplary artificial intelligence entry management system if someone intrudes into a geofence location. An exemplary artificial intelligence entry management system may be configured to direct and control a robot to investigate abnormalities in a geofenced area, MDA, or surrounding area, such as when a noise is detected. Likewise, an exemplary robot may be configured to follow and record a delivery to an access point, to ensure the delivery is made.

A drone swarm may be utilized to follow track and deter threats. A drone swarm is defined as two or more robots, such as aerial robots, also referred to as drones, that follow an individual, such as a threat. A drone swarm may follow a person that has stolen a package delivered to an access point, or a storage container or that has breached a geofence area or a monitored designated are or areas (MDA) created by the artificial intelligence entrance management device in the view of the camera.

An exemplary artificial intelligence entry management device is configured to work on a networkable platform with networked software accessible and interactive with said entry management device and member devices running the networked software and participating on the networkable platform, wherein the networkable platform is configured for communication between said member devices including member devices of owners, service personnel, property management, real estate professionals, short term rentals, hotels, and employees, wherein the networkable platform is configured to provide access and logistics to access points.

Another feature of the disclosed artificial intelligence entry management system may be that the software of the artificial intelligence device can be configured to relate to the occupants of the building for enabling name recognition by the entry management device.

Another feature of the disclosed artificial intelligence entry management system may be that the software of the artificial intelligence device can be configured to enable the entry management device to establish contact, record messages, or deliver a message from the person or persons named.

Another feature of the disclosed artificial intelligence entry management system may be that the artificial intelligence device can be configured to interface with other artificial intelligence devices.

Another feature of the disclosed artificial intelligence entry management system may be that when the entry management device is activated by motion, the detection of a paired mobile device, the presentation of a virtual key, or the owner/administrator, the entry management device may be configured to cause the programming instructions of the software to activate or turn on the artificial intelligence entry management system.

Another feature of the disclosed artificial intelligence entry management system may be that the artificial intelligence device may be configured to cause the entry management device to detect the person and interpret voice detected by the microphone from the person.

Another feature of the disclosed artificial intelligence entry management system may be that the intelligent response provided by the artificial intelligence device may be selected from a group consisting of: logistics, a greeting, a command, directions, a message, an inquire, a recording request, an alarm to the speaker, the like, and/or combinations thereof.

Another feature of the disclosed artificial intelligence entry management system may be that the wireless communication device may be configured to establish the identity of the person or the device once paired. Wherein, after pairing, the artificial intelligence device may be configured to recognize the device and provide a customized greeting, specific instructions, access, or actions for the associated device.

Another feature of the disclosed artificial intelligence entry management system may be that the artificial intelligence device may be configured to require authentication of an image or mobile device that is active and unlocked, the device must be active, or combinations thereof, prior to providing the customized greeting, the specific instructions, access, or the actions for the associated device.

Another feature of the disclosed artificial intelligence entry management system may be that the artificial intelligence device may be configured to recognize the previously paired mobile device and a virtual key or an identification sequence. Wherein, if there is not a confirmed identification, a third-party authentication is sought which is an embedded code within the virtual key, or an audible or verbal response code including a word or words, a sentence, a number or numbers, sounds, or letters.

Another feature of the disclosed artificial intelligence entry management system may be that the virtual key utilized may be a humanly created mark, drawing, written sequence of numbers, letters, abstract sketch, or picture. A virtual key may be a digital photograph that an administrator sends to a third party for entry. The digital photograph may be from the administrator's library of photographs, for example. A virtual key may include words, letters, and the like. A virtual key may include a particular motion across a touchscreen, such as the display screen of the artificial intelligence entry management device. A virtual key that is from an administrator's personal photo library or stored on their electronic device in their photo gallery is a personalized virtual key. Also, a virtual key created by an administrator, such as by using a touch screen to draw a virtual key, such as a specific zig-zag pattern, is also a personalized virtual key. An application software may be part of the artificial intelligence entry management system and may be opened for an administrator to create a unique personalized virtual key through taking a photograph, or using the touchscreen to draw out a virtual key. This App or subroutine may be opened when a new authorization for entry in entered into the system. The system may ask for the person's name, their contact information, time or entry, or span of time, access point to be unlocked and for any messages to be delivered to the person/entrant upon presenting the virtual key to the artificial intelligence entry management device. A personalized virtual key is a digital file sent by an administrator that is created on or stored on their electronic device and therefore may be more secure than a virtual key that is generic.

A virtual key can be used as an electronic device or file virtual key, wherein the virtual key is used to unlock an electronic device or a file in an electronic device. A computer may require a person to show a virtual key to a camera, such as a camera coupled to the computer before the computer will unlock for use. The virtual key may take the place of a password that is typed into the computer. Passwords can be hacked and stolen but a virtual key may be much more difficult to obtain as it is configured on a separate electronic device or a separate physical item. Likewise, a virtual key may be used to unlock a file on an electronic device. The computer may request that a virtual key be verified by showing the virtual key to the camera of the computer before a file can be opened. Again, this may be very difficult for a hacker to obtain.

An exemplary artificial intelligence entry management system may require a plurality of virtual key to be shown or displayed prior to verification and unlocking of a locked access point. A user may have to show two or more digital images that may have been sent to them by the artificial intelligence entry management system. In addition, the user may have to show these digital images, such as digital photographs, in a specific sequence to produce the virtual key. The artificial intelligence entry management system may send the digital photographs in a single file or may send them as separate files for security purposes. A virtual key may require a user to select digital images displayed on a display screen of the artificial intelligence entry management device. The artificial intelligence entry management device may display a plurality of images, such as four or more and the user may have to select one or more to produce the virtual key. Again, the artificial intelligence entry management system may send the images to the user and the user may then know which images to select on the display screen of the artificial intelligence entry management device. Furthermore, the artificial intelligence entry management system may require the user to select the digital images, or image virtual keys in a speci screen 17 that enables a user to select one or more digital images for entry. The user may have to select a plurality of digital images to produce a virtual key and the image virtual key may require each image virtual key 50, 50', 50" to be selected in a specific sequence, such as balloon, dog, cat, for example. A plurality of other digital images 66 or photographs may also be displayed on the display screen during the selection or entry of the virtual key.

A system administrator, or the artificial intelligence entry management system may automatically, send an image virtual key to a user, such as to their mobile electronic device, such as a mobile phone. The user may view the virtual key on their electronic device and then use the touch screen to select these images. The user may have to be within a certain range of the artificial intelligence entry management device to enable entry of the image virtual key by the selection of the correct images. Again, the images may have to be selected in a specific order. The artificial intelligence entry management system may send image virtual keys to a user when they are expected to arrive, such as to a cleaning professional prior to their weekly scheduled arrival. Then, when they arrive the artificial intelligence entry management device may communicate with the mobile electronic device to send the image virtual key for selection by the user. A plurality of digital images may be displayed on the user's mobile electronic device and they may then use the touch screen on their mobile electronic device to select the image virtual key.

Another feature of the disclosed artificial intelligence entry management system may be that the wireless communication device of the entry management device may be configured for exchanging data between the entry management device and fixed and mobile devices over short distances using Wi-Fi or UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.).

Another feature of the disclosed artificial intelligence entry management system may be that the artificial intelligence entry management system may be configured to notify designated security personnel.

Another feature of the disclosed artificial intelligence entry management system may be that the entry management device may be configured to work on a networkable platform with networked software accessible and interactive with any other devices running the networked software and participating on the networkable platform. Wherein the networkable platform is configured for use by a variety of members including owners, service personnel, property management, real estate professionals, short term rentals, hotels, employees, the like, etc., wherein the networkable platform may be configured to provide access and logistics to additional industries and uses.

In select embodiments of the disclosed artificial intelligence entry management system, a transponder device may be included. The transponder device may be configured to utilize a global positioning system or a wireless communication to identify a mobile device and begin to transmit a signal for easy identification and detection. In select embodiments, the transponder may be configured to be attached to a stationary object, a door, a room, a building box or a storage container. Wherein, upon the entry management device detecting the device, the programming instructions of the software may also be configured to: send out an audible noise, illuminate, provide mapping instructions or directions to the mobile device to provide guidance in locating a specific location of the stationary object, door, room, building box, or the storage container via the speaker; illuminate lights on the entry management device; provide a mapping direction on the device including: an exact location; a location inside a building, a building without a geo address, a container, a storage unit; the like; and/or combinations thereof. As such, another feature of the disclosed artificial intelligence entry management system may be that the transponder device can be configured to take over where a global positioning system ends to guide the person or the device to a specific location inside a geo-fence or outside a geo-fence. Another feature of the disclosed artificial intelligence entry management system may be that the entry management device may be configured to utilize the global positioning system, Wi-Fi, rf, or a wireless communication to identify a mobile device previously paired and initiate actions including messages, access, logistics to guide the person or the device to the specific location such that the geo position of the entry management device may activate various actions. Another feature of the disclosed artificial intelligence entry management system may be that when the transponder is activated and detects the person or the device within a set range, the transponder device may be configured to emit a signal, a sound, a light, or input to the device configured to guide and direct the person or the device to the specific location.

Another feature of the disclosed artificial intelligence entry management system may be that the camera can be adapted to read a virtual key from the person or the device, and upon reading the virtual key, the entry management device may be configured to unlock an access point, provide a greeting, instructions or logistics, record a message, or establish contact with the individual requested. In select embodiments, the virtual key may be a humanly created image selected from a group consisting of: a humanly created photo; a humanly created picture; a humanly created drawing; a humanly created mark; a humanly created number or numbers; a humanly created letter or letters; a humanly created word or words; the like; and/or combinations thereof.

In select embodiments of the disclosed artificial intelligence entry management system, the access point may be a delivery storage container or mailbox. In these embodiments, the entry management device may be configured to lock and unlock the delivery storage container or mailbox. In select embodiments, the delivery storage container or mailbox may include a refrigerated compartment on an inside of the delivery storage container or mailbox. The refrigerated compartment may be configured for food or other refrigerated items. In select embodiments, the refrigerated compartment may be a first portion of the inside of the delivery storage container, and a second portion of the inside of the delivery storage container is configured for parcels. In other select embodiments, the refrigerated compartment may be the entire inside of the delivery storage container. Yet in other select embodiments, the refrigerated compartment may be the entire inside of a first delivery storage container and a second delivery storage container may be configured for parcels. In other select embodiments, the delivery Storage container or mailbox may include a warmer on the inside of the delivery storage container or mailbox. The warmer may be configured to warm the inside of the delivery storage container or mailbox. The artificial intelligence entry management system may be configured to control the delivery storage container or mailbox with the ability to select warmer, refrigerated, parcel, or a combination thereof per section of the delivery storage container or mailbox.

In select embodiments, the delivery storage container or mailbox may be positioned just inside a door of a home and the entry management system may be configured to unlock and lock the door of the home for deliveries to the delivery storage container or mailbox. Wherein the position of the delivery storage container or mailbox may be configured to prevent the need for deliveries to be walked through the house to the kitchen. A feature of the delivery storage container or mailbox may be the inclusion of an ultraviolet light on an inside. The ultraviolet light may be configured for sanitizing the inside of the delivery storage container or mailbox including sanitizing any parcels placed in the inside of the delivery storage container or mailbox.

In select embodiments, the delivery storage container or mailbox may include the entry management device on an outside of the delivery storage container or mailbox. The entry management device may be configured in a separate location from the storage container however.

The artificial intelligence entry management system may be configured to produce an alarm including an alarm noise and/or light. The alarm may utilize a light and/or speaker that is part of the entry management device and/or the storage container. In select embodiments, the delivery storage container and/or the entry management device produces an alarm when the storage container is jostled or opened without authorization. A closure sensor may be configured to detect the position of the closure to the storage container and when the closure is opened without authorization, an alarm may be initiated. The storage container may also comprise a global positioning device, that is used by the artificial intelligence entry management system to monitor the location of the storage container. If the storage container is moved beyond a threshold distance from a set location, such as beyond the perimeter of an administrator's property, an alarm may be initiated. In this situation, the alarm may be initiated on the storage container, in an effort to prevent the storage container from being stolen and an alert notification may be sent to an administrator and/or authorities, such as the police. An exemplary storage container may also contain an accelerometer that detects if motion of the storage container. Again, if the storage container is jostled, such as when trying to be opened without authorization, an alarm may be initiated to deter the thief. Again, an alarm may be a light and/or sound emitted from the storage container and/or entry management device and an alert may be sent to an administrator when an alarm is activated.

A light on a delivery storage container may be configured for illuminating the delivery storage container and area around the delivery storage container or mailbox. A speaker on a delivery storage container may be configured to communicate with a delivery person and provide logistic instructions regarding a deliver, such as which compartment to deliver a package into. In other select embodiments, the delivery storage container or mailbox may include a power source being selected from a group consisting of: a wired power source; a battery operated power source; a solar power source; the like; and/or a combination thereof. In other select embodiments, the delivery storage container or mailbox may include a warmer configured to heat the inside of the delivery storage container or mailbox. In other select embodiments, the delivery storage container or mailbox may include a wireless connection configured to control the delivery storage device or mailbox via a mobile device or a personal computer, including being configured to control the locking and unlocking of the delivery storage container or mailbox, controlling the temperature inside of the delivery storage container or mailbox via the warmer or the refrigerated compartment, the ultraviolet light inside of the delivery storage container or mailbox, or combinations thereof.

Another feature of the disclosed artificial intelligence entry management system may be that the camera may be adapted to read a virtual key from the person or the device, and upon reading the virtual key, the entry management device may be configured to activate a drone to retrieve deliveries from a specific location.

Another feature of the disclosed artificial intelligence entry management system may be that the entry management device may be configured as a receptionist device for corporate, commercial, institutional or industrial applications. The receptionist device may be configured to provide custom messages for each occupant and for receiving and recording custom messages for each user. One feature of the receptionist device may be that information may be forwarded wirelessly to each occupant, or information is retrieved from the entry management device by displaying a virtual key assigned to each occupant. Another feature of the receptionist device may be that the entry management system may include a plurality the entry management devices configured as the receptionist device for corporate, commercial, institutional or industrial applications. Wherein each of the plurality of entry management devices may interact and communicate with each other, whereby the plurality of entry management devices are configured to relay messages to the occupant.

Another feature of the disclosed artificial intelligence entry management system may be that the microphone may be adapted to identify an audible key from the person or the device. Upon identifying the audible key via the microphone, the entry management device may be configured to unlock an access point or provide a greeting, information or logistics. In select embodiments, the audible key may be a word, words, a sentence, a number, a sound or sounds, wherein the microphone is configured to match the audible key with the person or device. In select embodiments, the artificial intelligence device may be configured to assign audible keys to a variety of users, whereby the artificial intelligence device may be configured to provide access or information to each of the variety of users. In other select embodiments, the artificial intelligence device may be configured to maintain a record of each of the variety of users. Yet in other select embodiments, the artificial intelligence device may be configured to record audible messages.

Another feature of the disclosed artificial intelligence entry management system is that the artificial intelligence entry management system is configured to record data, such as interactions with the system including, but not limited to, audio recordings, video recordings, dates, times, third person identification, such as electronic address, dates and/or times of entry, what access point was locked or unlocked, dates and times of system breaches, such as a lock being opened without access, or a storage container being moved. A sensor may be configured to monitor the lock status of a lock on an access point, including a lock on a storage container for delivery. In addition, a storage container may have a motion sensor or a GPS as described herein and the system may record if the storage container is tampered with or record a location if it is stolen and moved to a new location. The artificial intelligence entry management system may also keep records of the virtual keys used for entry. This recorded data may be kept on a database or computer storage drive and may be secured, whereby only a system administrator can access this recorded data.

In another aspect, the instant disclosure embraces an artificial intelligence entry management system with a plurality of entry management devices. Each of the plurality of entry management devices may be the disclosed artificial intelligence entry management device in any of the various embodiments and/or combination of embodiments shown and/or described herein. As such, in general, each of the entry management devices may be configured for use with an artificial intelligence device in communication with the entry management device including a processor with a non-transitory computer readable storage medium comprising software having program instructions configured for providing artificial intelligence to the artificial intelligence entry management device. A network platform in communication with each of the plurality of entry management devices may also be included. The network platform may be configured to allow each of the plurality of entry management devices to communication with each other.

In select embodiments of the disclosed artificial intelligence entry management system with a plurality of entry management devices, the plurality of entry management devices may be installed in a neighborhood. Wherein, each of the plurality of entry management devices may be configured with the ability to communicate if a burglary occurs in any other house, or activate and pan the streets to record all traffic activity.

The terminology used herein is for the purpose of describing particular embodiments only and is not intended to limiting of the disclosure. As used herein, the term "and/or" includes any and all combinations of one or more of the associated listed items. As used herein, the singular forms "a", "an" and "the" are intended to include the plural forms as well as the singular forms, unless the contest clearly indicates otherwise. It will be further understood that the terms "compromises" and/or "comprising" when used in this specification, specify the presence of stated features, steps, operations, elements and/or components, but do not preclude the presence of addition of one or more other features, steps, operations, elements, components and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

A storage container, as used herein, is a receptable configured for receiving a package and may have a lock that is controlled by the artificial entry management system, and may be a portable storage container that can be moved to a desired location or a storage container that is fixed in a location, such as a mailbox. A storage container may be an example of an access point that is locked and unlocked by the artificial entry management system.

A smart-home system, as used herein, is a system that utilizes electronic locks to lock and unlock entry ways, such as doors to a building such as a home or place of business from a remote source, such as a mobile device or mobile phone. A smart-home system may also have subsystems to turn on or off lights, set the temperature on a home heating or air conditioning system and the like.

In describing the disclosure, it will be understood that a number of thermal enhancements are disclosed. Each of these has individual benefit, and each can also be used in conjunction with one or more, or in some cases all, of the other disclosed techniques. Accordingly, for the sake of clarity, the description will refrain from repeating every possible combination of the individual steps in an unnecessary fashion. Nevertheless, the specification and claims should be read with the understanding that such combinations are entirely within the scope of the intervention and the claims.

It will be evident, however, to one skilled in the art that the present disclosure may be practiced without specific details.

The present disclosure is to be considered as an exemplification of the disclosure, and is not intended to limit the disclosure to the specific embodiments illustrated by the figures or description below.

The present disclosure will not be described by referencing the appended figures representing preferred embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are with the spirit and scope of the present disclosure, are contemplated thereby, and are intended to be covered by the following general description.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 4 shows a front view of the artificial intelligence entry management device according to FIG. 2;

FIG. 5 shows a back view of the artificial intelligence entry management device according to FIG. 2;

FIG. 7 shows a back left perspective partially disassembled view of the artificial intelligence entry management device according to FIG. 2;

Figure 1:
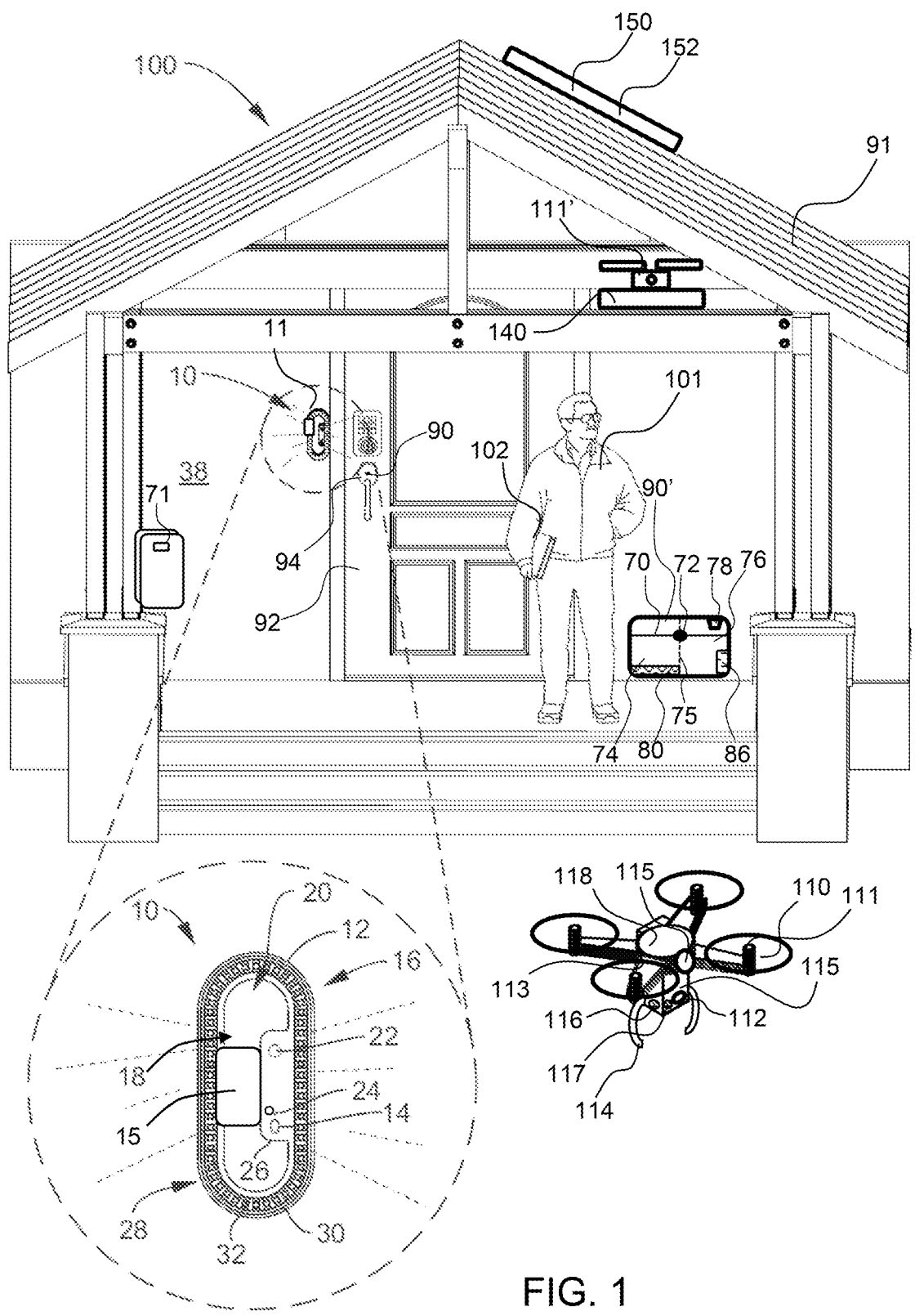
FIG. 1 shows a perspective environmental view of an artificial intelligence entry management device and system according to select embodiment of the disclosure.
Figure 2:
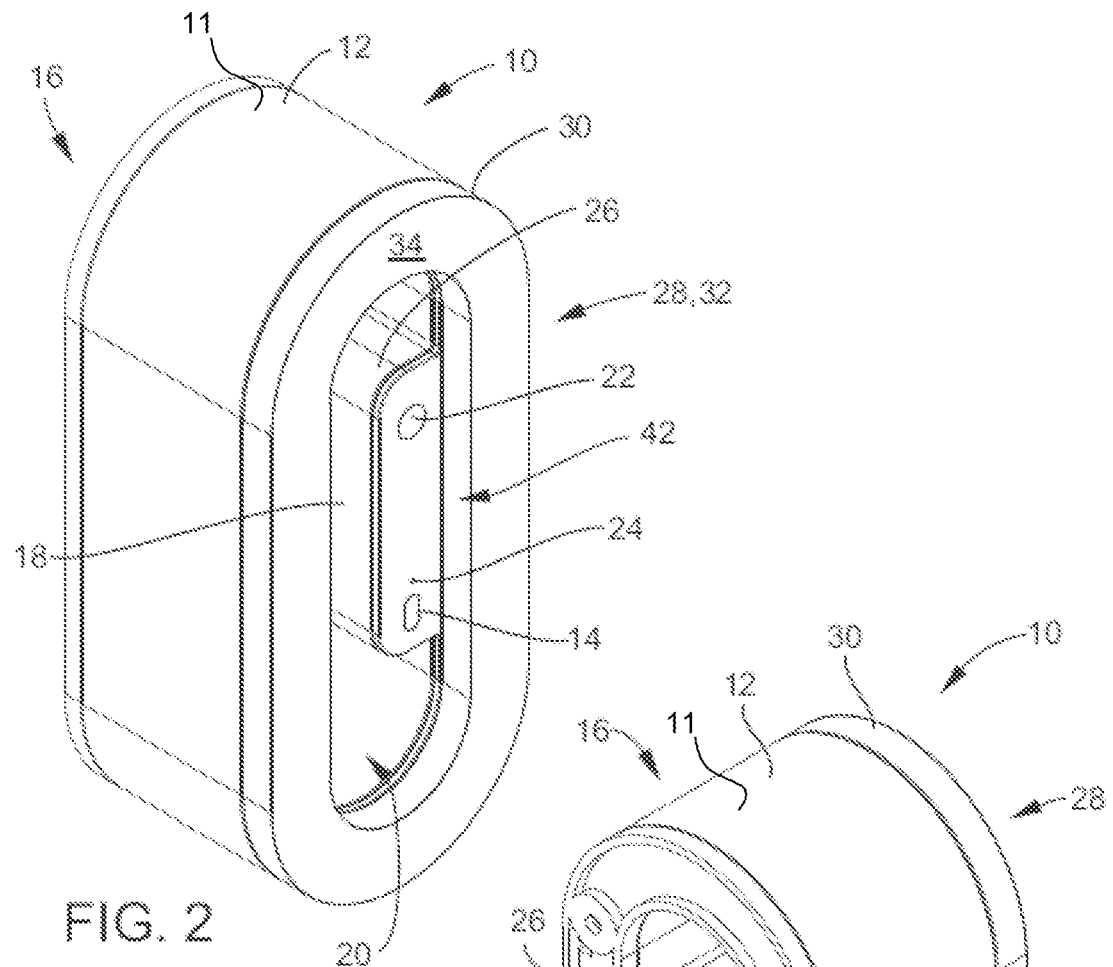
FIG. 2 shows a front left perspective view of an artificial intelligence entry management device according to select embodiment of the disclosure.
Figure 3:
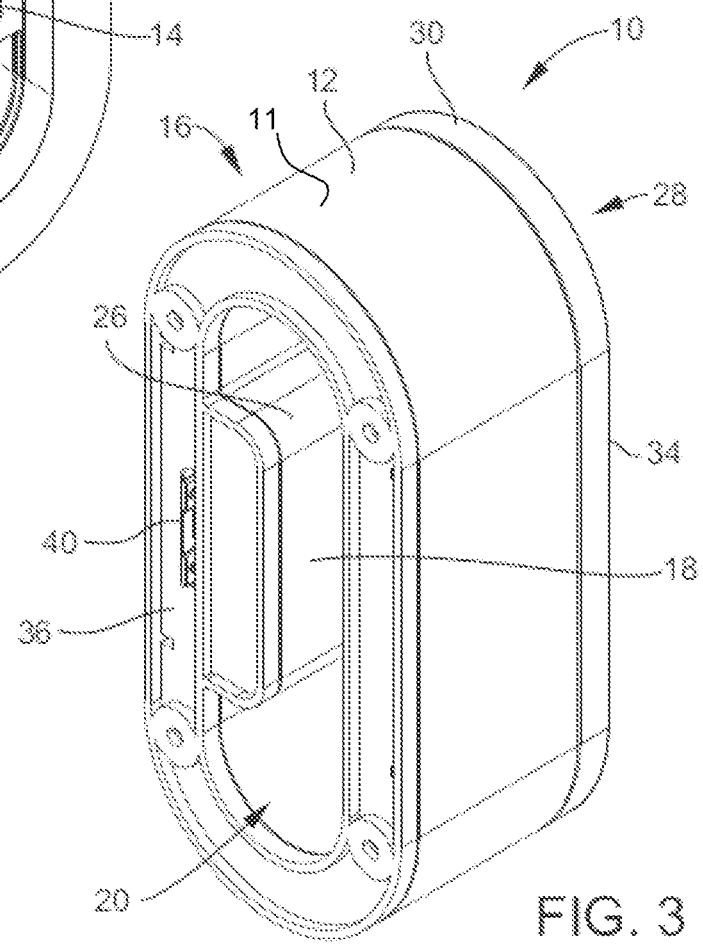
FIG. 3 shows a back left perspective view of the artificial intelligence entry management device according to FIG. 2.
Figure 6:
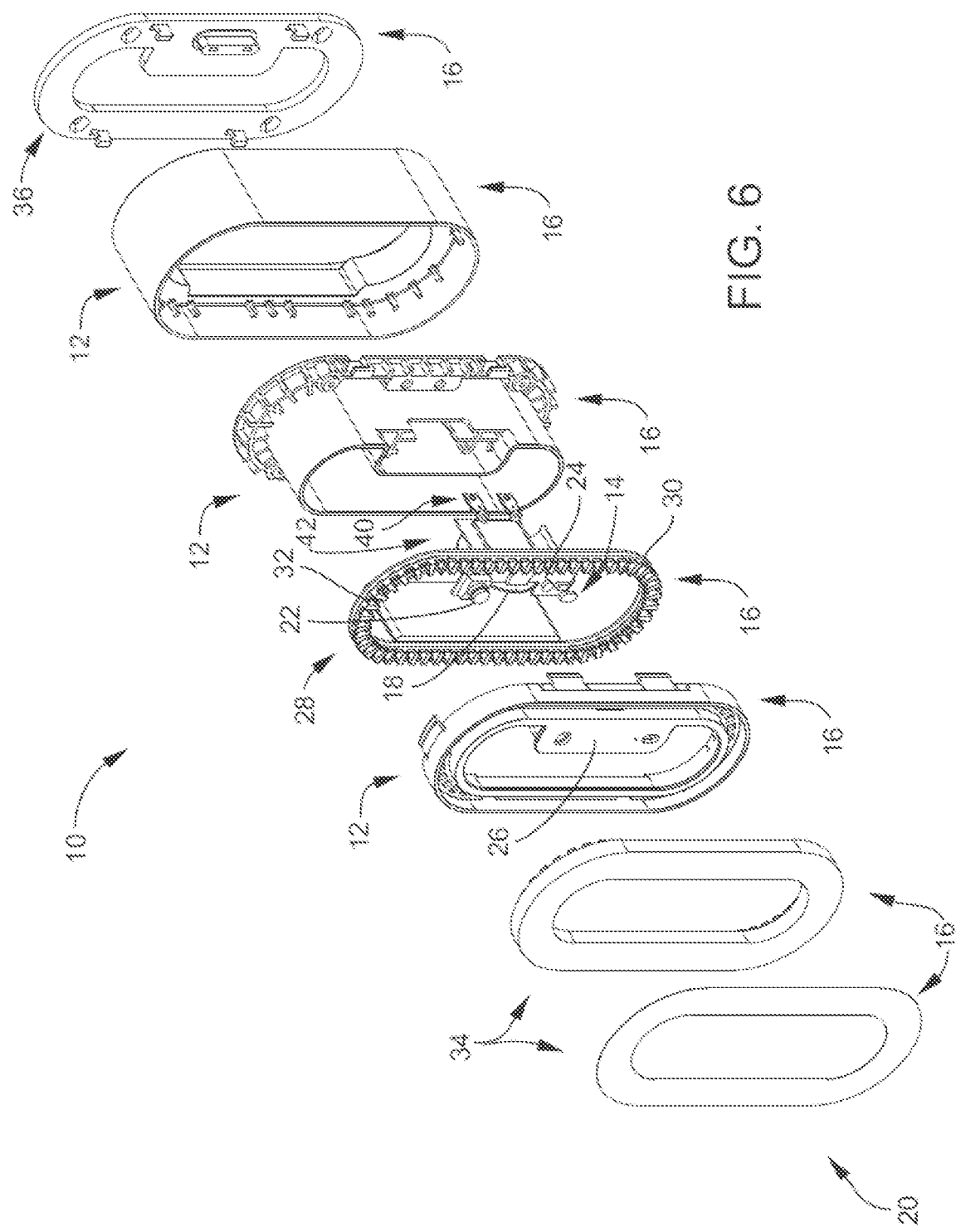
FIG. 6 shows a front right perspective partially disassembled view of the artificial intelligence entry management device according to FIG. 2.
Figure 1:
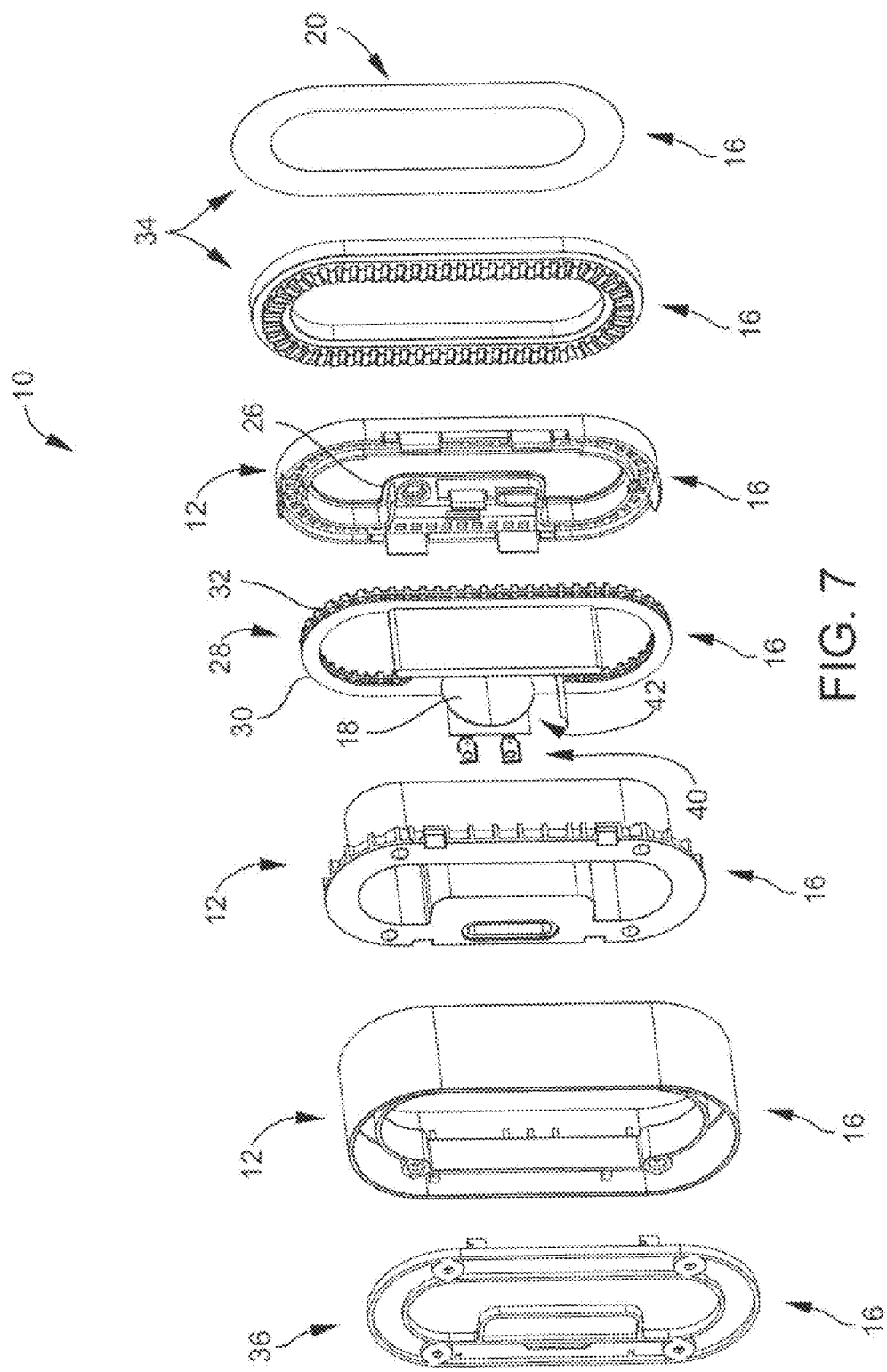

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION OF THE ILLUSTRATED EMBODIMENTS

Referring now to FIGS. 1-7, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-7, in a possibly preferred embodiment, the present disclosure overcomes the above-mentioned disadvantages and meets the recognized need for such an apparatus or method by providing of a smart-home system 11 having an artificial intelligence entry management device 10 for an entry management system 100. Artificial intelligence entry management device 10 may generally include camera 22, microphone 24, motion detector 14, speaker 18, and housing 12. Housing 12 may have oval shape 16 with substantially open middle 20. Substantially open middle 20 may have housing protrusion portion 26 configured to house camera 22, microphone 24, motion detector 14, and speaker 18.

Plurality of lights 28 may be included with artificial intelligence entry management device 10. Plurality of lights 28 may be positioned around periphery 30 of oval shape 16 of housing 12. In select embodiments, each of the plurality of lights 28 may be light emitting diode 32, also known as LEDs. One feature may be that each of the light emitting diodes 32 of the plurality of lights 28 may be configured to light up based on sounds emitted from speaker 18, With this configuration, one feature of the disclosure may be that plurality of lights 28 may be configured to mimic artificial intelligence entry management device 10 as if it were talking. Another feature may be that plurality of lights 28 can be configured to indicate an alarm has been triggered by flashing. Another feature may be that plurality of lights 28 can be configured to indicate a status of the artificial intelligence entry management device 10. As shown in the Figures, and best shown in FIGS. 6 and 7, in select embodiments of the disclosed artificial intelligence entry management device 10, LED lens 34 may be included. LED lens 34 may be configured to cover and protect the plurality of lights 28, like light emitting diodes 32. LED lens 34 may have oval shape 16 of housing 12.

Mounting bracket 36 may be included with artificial intelligence entry management device 10. Mounting bracket 36 may be configured for mounting housing 12 of artificial intelligence entry management device 10 to surface 38, as shown in FIG. 1. Mounting bracket 36 may have oval shape 16 of housing 12.

Power source 40 may be included with artificial intelligence entry management device 10. Power source 40 may be a hardwired power source (as shown in the Figures), a battery powered power source, the like, or combinations thereof.

Wireless communication device 42 may also be included with artificial intelligence entry management device 10. Wireless communication device 42 may be housed inside of housing protrusion portion 26 of housing 12 of artificial intelligence entry management device 10. Wireless communication device 42 may be configured to communicate with entry management system 100, like a networked software platform, or the like, or other artificial intelligence entry management devices 10 via a wireless communication. The wireless communication of wireless communication device 42 may be, but is not limited to, Wi-Fi; UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.); the like; or combinations thereof.

One feature of the disclosed artificial intelligence entry management device 10 may be that speaker 18 can be positioned in housing protrusion portion 26 and oriented toward substantially open middle 20. This orientation of speaker 18 may be for projecting sound from speaker 18 out of artificial intelligence entry management device 10.

Another feature of the disclosed artificial intelligence entry management device 10 may be the inclusion of a processor. The processor may have a non-transitory computer readable storage medium including software. The software of the processor may have program instructions configured for providing artificial intelligence to artificial intelligence entry management device 10. In select embodiments, the software may be configured for development of intelligence within artificial intelligence entry management device 10, including, but not limited to, speech recognition, problem-solving, learning, planning, the like, combinations thereof, etc. In select embodiments of artificial intelligence entry management device 10, the processor may be a networked processor. The networked processor may be connected to artificial intelligence entry management device 10 via a wireless communication to wireless communication device 42 on artificial intelligence entry management device 10. In other select embodiments, the processor may be a chipped processor. The chipped processor may be housed inside of artificial intelligence entry management device 10, including, but not limited to, inside of housing protrusion portion 26 of housing 12 of artificial intelligence entry management device 10.

In another aspect, the instant disclosure embraces artificial intelligence entry management system 100. Artificial intelligence entry management system 100 may generally include utilizing the disclosed artificial intelligence entry management device 10 in any of the various embodiments and/or combination of embodiments shown and/or described herein. As such, in general, the disclosed artificial intelligence entry management system 100 may include the disclosed AI entry management device 10 with camera 22, microphone 24, motion detector 14, speaker 18, wireless communication device 42, the like, and/or combinations thereof. In addition, artificial intelligence entry management system 100 may include an artificial intelligence device. The artificial intelligence device may be in communication with AI entry management device 10. The artificial intelligence device may include a processor with a non-transitory computer readable storage medium having software with program instructions configured for providing artificial intelligence to the artificial intelligence entry management device 10.

The AI entry management device system 100 and AI entry management device 10 may be configured to unlock an access point including, but not limited to a door or gate or a storage container. As shown in FIG. 1, the AI entry management device 10 is configured on a dwelling 91, an exemplary access point 90, and is configured to unlock the door-lock 94 on the door 92 of the dwelling. Also, the AI entry management device 10 may be configured to unlock the lock 72 on the storage container 70, another access point 90', to enable retrieval of items therein or delivery of item into the storage container, or a compartment thereof.

As shown in FIG. 1, an exemplary artificial intelligence entry management system may include a robot 110, such as an aerial robot 111, that may use a package manipulator 114 to pick up and release packages for movement of a package from a first location to a secondary location. The aerial robot is configured to fly and is commonly referred to as a drone. The aerial robot may also have a camera 112 for taking digital photographs or video that may be transferred to the exemplary artificial intelligence entry management system. The aerial robot may be used for monitoring and surveillance of a delivery area and may be used for creating and monitoring a geofence and/or MDA after a package has been delivered. After a package has been delivered, the aerial robot may monitor an area and take images that can be delivered to an administrator of someone entering a geofence area and/or an MDA. A robot speaker 116 may be used to communicate with a third party, such as a delivery person, to provide logistic instructions for package delivery. A speaker may also be used as an audible alarm. A microphone 117 may be used for receiving communication from a third party that is provided to an administrator of the artificial intelligence entry management system, for example. An exemplary robot has a wireless signal transceiver 118 for communication with the artificial intelligence entry management system 100 such as the artificial intelligence entry management device 10. The robot may send photographs, video, audio recordings and the like to the artificial intelligence entry management system which may be then transferred to an administrator or a third party. A robot may also communicate directly with an administrator or authority using the wireless signal transceiver 118. A robot may have controller 113 that incorporates artificial intelligence to control functions of the robot. The artificial intelligence of the robot may interface with the artificial intelligence of the artificial intelligence entry management device, for example. Robot 110, like a drone or a land robot, may be configured to be activated by AI entry management system to investigate any suspicious activity, or threats, determined by the AI device. Once activated, robot 110, like a drone may be configured to leave its docking station and investigate such suspicious activities and/or threats. Whereby, robot 110 or drone can relay information, like images, back to the system, issue a command to the suspicious activity or threat, and follow or track the individuals or vehicles, like by transmitting images of the vehicle, license plate, color, make, etc., as well as providing locational information or direction information of such suspicions activities and/or threats. As such, robot 110, such as a drone, may be configured as a deterrent for suspicious activities or threats. A robot may have a light 119 that is activated when a motion or sound above a threshold value is detected. The robot speaker 116 may emit an alarm and the robot light 119 may flash a color when a threat is detected, such as a person that is not identified by the artificial intelligence entry management system or someone carrying a weapon, such as a gun or knife.

An exemplary robot 110, such as the aerial robot 111 may be configured to return to a docking station 140 wherein the robot can monitor an area with the camera 112 and microphone 117 and recharge. As shown, aerial robot 111' is docked to the docking station 140 and is being charged, wherein a rechargeable battery 115 is receiving electrical power. This charging electrical power may come from the dwelling, or from a renewable power source 150, such as a solar panel 152 as shown.

An artificial intelligence entry management system 100 may include or interface with a storage container 70 to lock and unlock said storage container for deliver and safe storage of items therein. A storage container 70, including a mailbox 71, collectively referred to herein as a storage container, may comprise a lock 72 and a wireless signal transceiver 78 for receiving a wireless signal from the wireless communication device 42 of the AI entry management device 10. An exemplary storage container may have a plurality of compartments that may have separate locks 72, 72' for separate closures 79, 79' and features for retaining items therein, such as a heating device 80 or refrigeration device 86. As shown, a first compartment 74 includes a heating device 80 and a second compartment 76, separated from the first compartment by a divider 75, has a refrigeration device 86. Grocery items that need to be refrigerated may be delivered into the refrigerated compartment and in cold climates, medications and other items may be stored in the heated compartment to prevent freezing.

Figure 8:
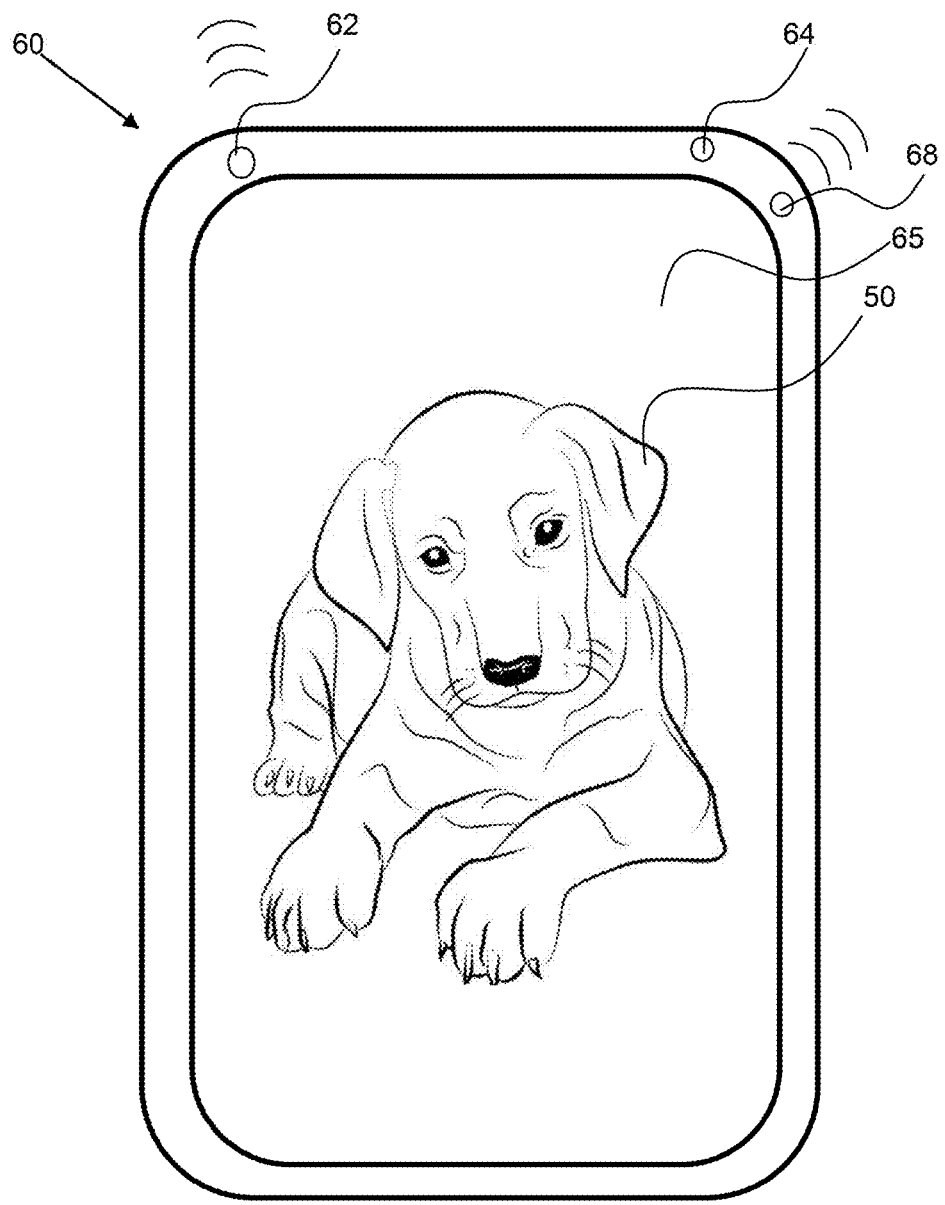
FIG. 8 shows a front view of a mobile electronic device with a digital photograph that is an image virtual key configured to be identified by the camera of the artificial intelligence entry management device and verified for access to an access point.

An artificial intelligence entry management system 100 may be configured to unlock the lock 72 of the storage container 70, or a compartment thereof, when a virtual key is verified by the AI entry management device 10. As described herein, a virtual key may be an image that is read by camera 22 of the AI entry management device 10, or an audible virtual key that is received by the microphone 24 of the AI entry management device 10. An image virtual key 50, may be a digital image that is sent by an AI entry management system administrator, such as through an APP or as an attachment in a text message to a third party's mobile electronic device. As shown in FIG. 8, an administrator has provided a digital photograph of their puppy to a second parties mobile electronic device 60 which was received by a wireless communication device 62, such as a wireless signal transceiver. The third party may then show this image on the display screen 65 to the camera 22 of the AI entry management device 10 to gain access to an access point, wherein the door-lock 94 of the door to the dwelling is unlocked, or the lock 72 on the storage container 70 is unlocked, for example. In addition, the virtual key may include an audible key that is played by the mobile device through the speaker 68. The microphone on the AI entry management device may receive the audible key in order to verify it. In an exemplary embodiment, both an image virtual key and an audible key are required for verification before an access point is unlocked. The mobile electronic device 60 may also have a microphone 64 for providing verbal input that is delivered to the artificial intelligence entry management system.

One feature of artificial intelligence entry management system 100 may be that the software may have programming instructions that, when executed, cause AI entry management device 10 to execute entry management and ecommerce support functions including the delivery of messages, directives, instructions, greetings, recordings, and facilitating the connection of a third party for two-way audio/video communication.

A greeting may be a contextual greeting that includes some context to the third party, such as their name, or the name of an organization they are associated with. For example, a friend Jan, may come over to water the plants while an owner is away and the AI entry management device system may provide a greeting to Jan that includes her name. In another example, a UPS delivery driver may be tracked by the AI entry management device system and a greeting that includes the "UPS" name may be provide when the delivery person moves within a threshold range or distance of the AI entry management device or when they provide their virtual key. The artificial intelligence entry management system may track an electronic device having a global positioning system by receiving a location from the mobile electronic device or by interfacing with a program, such as an Application software, or App, to receive location information regarding the electronic device. A package delivery person may carry a transponder or other device that is used to track their location or the location of their vehicle and the artificial intelligence entry management system may interface with a program or database to determine this location.

A greeting may be contextual for a particular occasion, such as for holidays or special occasions including birthdays, anniversaries and the like. An exemplary AI entry management device system may offer occasion greeting packages that include a song or other occasion specific messages for an additional fee to the administrator.

Another feature of artificial intelligence entry management system 100 may be that motion detector 14 of AI entry management device 10 may be configured to activate upon motion and provide a greeting, command, or instructions, whereby system 100 may activate upon recognition of a paired mobile device. The paired mobile device may be a stored identification paired via the approval of an owner/administrator. The owner/administrator may be individuals assigned programming rights configured to allow the owner/administrator to make selections remotely via the artificial intelligence entry management system.

Another feature of artificial intelligence entry management system 100 may be that, when activation occurs, artificial intelligence entry management device 10 may be configured to provide a spontaneous response, or a pre-programmed response in accordance with the device it detects.

Another feature of artificial intelligence entry management system 100 may be that artificial intelligence entry management device 10 may be configured to provide a spontaneous response, or a pre-programed response in accordance with the image read by camera 22.

Another feature of artificial intelligence entry management system 100 may be that, when activated, simultaneously, a notification may be sent to the owner/administrator with an option to engage remotely in two-way communication, activate a preprogrammed or custom message, provide a virtual key or activate the recording for a message, detect a person or a device via camera 22, microphone 24, motion detector 14, or wireless communication device 42 and provide an intelligent response to the person or device via speaker 18 or wireless communication device 42.

Another feature of artificial intelligence entry management system 100 may be that when a package is scanned by camera 22 of AI entry management device 10, artificial intelligence entry management system 100 may be configured to initiate a geo-fence and/or MDA around an area of AI entry management device 10. A geo-fence is a monitored area within proximity of an access point and/or the AI entry management device. An MDA, or monitored designated area, is an area created by AI entry management device within the field of view of camera 22. A geo-fence and/or MDA proximity distance from an access point and/or the AI entry management device may be about 1 m or more, about 5 m or more, about 10 m or more, about 20 m or more, about 50 m or more and may be dynamic as a mobile robot may interface with the AI entry management device. Wherein, when the geo-fence and/or MDA of AI entry management device 10 is initiated, AI entry management device 10 may be configured to utilize motion detector 14, camera 22, microphone 24, or combinations thereof, for detecting a breach of the geo-fence area and/or MDA around AI entry management device 10. In select embodiments, when a breach of the geo-fence area and/or MDA around AI entry management device 10 is detected, artificial intelligence entry management system 100 may be, but is not limited to, being configured to: alert the owner via a wireless notification; trigger the entry management device to set off an alarm of the entry management device; trigger an external alarm; the like; and/or or combinations thereof. In select embodiments, when the package is placed in the geo-fence area and/or MDA around AI entry management device 10, the carrier of the package can activate AI entry management device 10 to monitor the geo-fence area and/or MDA via motion detector 14, camera 22, microphone 24, or combinations thereof. In other select embodiments, a carrier of the package can deactivate the geo-fence area and/or MDA around AI entry management device 10 by scanning of the package or a virtual key, whereby the package may be retrieved. Once scanned, the notification, alarms, or combinations thereof are deactivated by the scanning of the package or the virtual key, and a subsequent scan can reactivate the geo-fence area and/or MDA around AI entry management device 10.

Another feature of artificial intelligence entry management system 100 may be that AI artificial intelligence device 10 can be configured to learn various inputs.

Another feature of artificial intelligence entry management system 100 may be that the software of the artificial intelligence device can be configured to relate to the occupants of the building for enabling name recognition by AI entry management device 10.

Another feature of artificial intelligence entry management system 100 may be that the software of the artificial intelligence device can be configured to enable AI entry management device 10 to establish contact, record messages, or deliver a message from the person or persons named.

Another feature of artificial intelligence entry management system 100 may be that the artificial intelligence device can be configured to interface with other artificial intelligence devices, like other AI entry management devices 10 configured as a part of artificial intelligence entry management system 100.

Another feature of artificial intelligence entry management system 100 may be that when AI entry management device 10 is activated by motion, the detection of a paired mobile device, the presentation of a virtual key, or the owner/administrator, AI entry management device 10 may be configured to cause the programming instructions of the software to activate or turn on artificial intelligence entry management system 100.

Another feature of artificial intelligence entry management system 100 may be that AI artificial intelligence device 10 may be configured to cause AI entry management device 10 to detect the person and interpret voice detected by microphone 24 from the person.

Another feature of artificial intelligence entry management system 100 may be that the intelligent response provided by the artificial intelligence device may include, but is not limited to: logistics, a greeting, a command, directions, a message, an inquire, a recording request, an alarm to speaker 18, the like, and/or combinations thereof.

Another feature of artificial intelligence entry management system 100 may be that wireless communication device 42 may be configured to establish the identity of the person or the device once paired. Wherein, after pairing, the artificial intelligence device may be configured to recognize the device and provide a customized greeting, specific instructions, access, or actions for the associated AI device 10.

Another feature of artificial intelligence entry management system 100 may be that the artificial intelligence device may be configured to require authentication of an image or mobile device that is active and unlocked, AI device 10 must be active, or combinations thereof, prior to providing the customized greeting, the specific instructions, access, or the actions for the associated device 10.

Another feature of artificial intelligence entry management system 100 may be that the artificial intelligence device may be configured to recognize the previously paired mobile device and a virtual key or an identification sequence. Wherein, if there is not a confirmed identification, a third party authentication is sought which is an embedded code within the virtual key, or an audible or verbal response code including, but not limited to, a word or words, a sentence, a number or numbers, sounds, or letters.

Another feature of artificial intelligence entry management system 100 may be that the virtual key utilized may be a humanly created mark, drawing, written sequence of numbers, letters, abstract sketch, or picture.

Another feature of artificial intelligence entry management system 100 may be that wireless communication device 42 of AI entry management device 10 may be configured for exchanging data between AI entry management device 10 and fixed and mobile devices over short distances using wireless communications, including, but not limited to, Wi-Fi or UHIF radio waves in the industrial, scientific and medical radio bands, from 2.402 GHz to 2.480 GHz, and building personal area networks (PANS), also known as Bluetooth® (Bluetooth trademark owned by Bluetooth SIG, Inc. of Kirkland, Wash.).

Another feature of artificial intelligence entry management system 100 may be that artificial intelligence entry management system 100 may be configured to notify designated security personnel.

Another feature of artificial intelligence entry management system 100 may be that AI entry management device 10 may be configured to work on a networkable platform with networked software accessible and interactive with any other devices running the networked software and participating on the networkable platform. Wherein the networkable platform is configured for use by a variety of members including owners, service personnel, property management, real estate professionals, short term rentals, hotels, employees, the like, etc. Wherein the networkable platform may be configured to provide access and logistics to additional industries and uses.

In select embodiments of artificial intelligence entry management system 100, a transponder device may be included. The transponder device may be configured to utilize a global positioning system or a wireless communication to identify a mobile device and begin to transmit a signal for easy identification and detection. In select embodiments, the transponder device may be configured to be attached to a stationary object, a door, a room, a building box or a storage container. Wherein, upon AI entry management device 10 detecting the transponder device, the programming instructions of the software may also be configured to: send out an audible noise, illuminate, provide mapping instructions or directions to the mobile device to provide guidance in locating a specific location of the stationary object, door, room, building box, or the storage container via the speaker; illuminate lights on the entry management device; provide a mapping direction on the device including: an exact location; a location inside a building, a building without a geo address, a container, a storage unit; the like; and/or combinations thereof. As such, another feature of artificial intelligence entry management system 100 may be that the transponder device can be configured to take over where a global positioning system ends to guide the person or the device to a specific location inside a geo-fence or outside a geo-fence. Another feature of artificial intelligence entry management system 100 may be that AI entry management device 10 may be configured to utilize the global positioning system, Wi-Fi, rf, Bluetooth®, or another wireless communication to identify a mobile device previously paired and initiate actions including messages, access, logistics to guide the person or the device to the specific location such that the geo position of AI entry management device 10 may activate various actions. Another feature of artificial intelligence entry management system 100 may be that when the transponder device is activated and detects the person or the device within a set range, the transponder device may be configured to emit a signal, a sound, a light, or input to AI entry management device 10 configured to guide and direct the person or the device to the specific location.

Another feature of artificial intelligence entry management system 100 may be that camera 22 can be adapted to read a virtual key from the person or the device, and upon reading the virtual key, AI entry management device 10 may be configured to unlock an access point, provide a greeting, instructions or logistics, record a message, or establish contact with the individual requested. In select embodiments, the virtual key may be a humanly created image including, but not limited to: a humanly created photo; a humanly created picture; a humanly created drawing; a humanly created mark; a humanly created number or numbers; a humanly created letter or letters; a humanly created word or words; the like; and/or combinations thereof.

In select embodiments of artificial intelligence entry management system 100, the access point may be a delivery storage container or mailbox. In these embodiments, AI entry management device 10 may be configured to lock and unlock the delivery storage container or mailbox. In select embodiments, the delivery storage container or mailbox may include a refrigerated compartment on an inside of the delivery storage container or mailbox. The refrigerated compartment may be configured for food or other refrigerated items. In select embodiments, the refrigerated compartment may be a first portion of the inside of the delivery storage container, and a second portion of the inside of the delivery storage container is configured for parcels. In other select embodiments, the refrigerated compartment may be the entire inside of the delivery storage container. Yet in other select embodiments, the refrigerated compartment may be the entire inside of a first delivery storage container and a second delivery storage container may be configured for parcels. In other select embodiments, the delivery storage container or mailbox may include a warmer on the inside of the delivery storage container or mailbox. The warmer may be configured to warm the inside of the delivery storage container or mailbox. Wherein, a feature of artificial intelligence entry management system 100 may be that system 100 may be configured to control delivery storage container or mailbox the ability to select warmer, refrigerated, parcel, or a combination thereof per section of the delivery storage container or mailbox. In select embodiments, the delivery storage container or mailbox may be positioned just inside a door of a home and AI entry management system 100 may be configured to unlock and lock the door of the home for deliveries to the delivery storage container or mailbox. Wherein the position of the delivery storage container or mailbox may be configured to prevent the need for deliveries to be walked through the house to the kitchen. A feature of the delivery storage container or mailbox may be the inclusion of an ultraviolet light on an inside. The ultraviolet light may be configured for sanitizing the inside of the delivery storage container or mailbox including sanitizing any parcels placed in the inside of the delivery storage container or mailbox. In select embodiments, the delivery storage container or mailbox may include AI entry management device 10 on an outside of the delivery storage container or mailbox. In other select embodiments, the delivery storage container or mailbox may include an alarm attached to the delivery storage container or mailbox configured for security. In other select embodiments, the delivery storage container or mailbox may include lighting attached to the delivery storage container or mailbox configured for illuminating the delivery storage container or mailbox and area around the delivery storage container or mailbox. In other select embodiments, the delivery storage container or mailbox may include a power source which may be, but is not limited to: a wired power source; a battery operated power source; a solar power source; the like; and/or a combination thereof. In other select embodiments, the delivery storage container or mailbox may include a warmer configured to heat the inside of the delivery storage container or mailbox. In other select embodiments, the delivery storage container or mailbox may include a wireless connection configured to control the delivery storage device or mailbox via a mobile device or a personal computer, including being configured to control the locking and unlocking of the delivery storage container or mailbox, controlling the temperature inside of the delivery storage container or mailbox via the warmer or the refrigerated compartment, the ultraviolet light inside of the delivery storage container or mailbox, or combinations thereof.

Another feature of artificial intelligence entry management system 100 may be that camera 22 may be adapted to read a virtual key from the person or the device, and upon reading the virtual key, AI entry management device 10 may be configured to activate a drone to retrieve deliveries from a specific location.

Another feature of artificial intelligence entry management system 100 may be that AI entry management device 10 can be configured as a receptionist device for corporate, commercial, institutional or industrial applications. The receptionist device may be configured to provide custom messages for each occupant and for receiving and recording custom messages for each user. One feature of the receptionist device may be that information may be forwarded wirelessly to each occupant, or information is retrieved from AI entry management device 10 by displaying a virtual key assigned to each occupant. Another feature of the receptionist device may be that AI entry management system 100 may include a plurality of AI entry management devices 10 configured as the receptionist device for corporate, commercial, institutional or industrial applications. Wherein each of the plurality of AI entry management devices 10 may interact and communicate with each other, whereby the plurality of AI entry management devices 10 may be configured to relay messages to the occupant.

Another feature of artificial intelligence entry management system 100 may be that microphone 24 may be adapted to identify an audible key from the person or the device. Upon identifying the audible key via microphone 24, AI entry management device 10 may be configured to unlock an access point or provide a greeting, information or logistics. In select embodiments, the audible key may be a word, words, a sentence, a number, a sound or sounds, wherein microphone 24 is configured to match the audible key with the person or device. In select embodiments, the artificial intelligence device may be configured to assign audible keys to a variety of users, whereby the artificial intelligence device may be configured to provide access or information to each of the variety of users. In other select embodiments, the artificial intelligence device may be configured to maintain a record of each of the variety of users. Yet in other select embodiments, the artificial intelligence device may be configured to record audible messages.

In another aspect, the instant disclosure embraces artificial intelligence entry management system 100 with a plurality of AI entry management devices 10. Each of the plurality of AI entry management devices 10 may be the disclosed artificial intelligence entry management device 10 in any of the various embodiments and/or combination of embodiments shown and/or described herein. As such, in general, each of the AI entry management devices 10 may be configured for use with an artificial intelligence device in communication with the entry management device 10 including a processor with a non-transitory computer readable storage medium comprising software having program instructions configured for providing artificial intelligence to the artificial intelligence entry management device 10. A network platform in communication with each of the plurality of AI entry management devices 10 may also be included. The network platform may be configured to allow each of the plurality of AI entry management devices 10 to communication with each other.

In select embodiments of artificial intelligence entry management system 100 with a plurality of AI entry management devices 10, the plurality of AI entry management devices 10 may be installed in a neighborhood. Wherein, each of the plurality of AI entry management devices 10 may be configured with the ability to communicate if a burglary occurs in any other house, or activate and pan the streets to record all traffic activity.

As shown in FIG. 1, AI entry management device 10 of AI entry management system 100 may be configured as a doorbell device 10. The doorbell device 10 can be positioned on or proximate to a door, and the system can include a lock on the door. The doorbell device 10 can include a computing device comprising a computer processor, such as a microcontroller. The microcontroller is operatively connected to camera 22 and the lock on the door via a Wi-Fi or Bluetooth® (Bluetooth trademark owned by Bluetooth SIG, Inc. of Kirkland, Wash.) signal. When camera 22 scans and processes a preprogrammed bar code, image, numbers or pictures, the microcontroller of the doorbell device 10 sends a signal unlocking the door lock. Also, camera 22 processes a preprogrammed bar code, image, numbers or pictures, a signal is received from the cloud server or computer processor after authentication causing a locking device to open or access to be gained. The doorbell device 10 can optionally include a card reader adapted for electronically reading identification cards, credit cards, and the like. The microcontroller can comprise a computer processor and a non-transitory computer readable storage medium comprising software having programming instructions that, when executed, cause the microcontroller to carry out the above described steps. According to an embodiment of the disclosure, the software can be adapted for use as an application on a mobile smart phone. The doorbell device 10 can include and interface with one or more artificial intelligence devices.

According to another embodiment of the disclosure, the system comprises the AI entry management device 10 or doorbell device 10 or an independent scanner located near or secured to a door, or in proximity to or secured to a lock box or other storage apparatus. The lock box or other storage apparatus can be adapted to contain letters, packages, or other deliveries. The lock box can be located near an entry point, built into a residential or commercial structure, located in a free-standing structure such as a mailbox or decorative column, in the ground or other places within the range of a Wi-Fi/Bluetooth® (trademark owned by Bluetooth SIG, Inc. of Kirkland, Wash.) signal. The independent scanner can have wireless or wired capabilities. The entire system can be wired, wireless or battery operated. A warning signal is delivered to an administrator(s) when any battery in the system becomes weak.

The independent scanner is capable of reading bar codes, images, numbers, and pictures. Upon reading and processing a preprogrammed bar code, image(s), numbers or pictures, a lock on the door, lock box or other storage apparatus is unlocked. Also, upon reading and processing of preprogrammed bar code, image(s), numbers or pictures, an appointed message or a general message can be delivered audibly or via a text to a mobile phone or an e-mail.

The independent scanner is capable of voice recognition. The independent scanner can comprise numbered buttons for additional authentication or to route information or notification to the appropriate user/client/owner. The independent scanner can be located at an entry point or in proximity of a lock box, storage facility or compartment. The scanner can comprise a storage or lockbox container with a built-in scanner either wired, wireless or battery operated.

According to an embodiment of the disclosure, the system can include a card reader capable of reading identification cards, credit cards, and the like. The card reader can be incorporated in the AI entry management device 10, or in the independent scanner.

According to an embodiment of the disclosure, the system can include a scanner/reader incorporated in another device connected to a storage container, box, storage facility or the like.

According to an embodiment of the disclosure, the system can include a secure storage container located on a property for the purpose of receiving packages and deliveries. The container can have an automatic locking and unlocking mechanism triggered directly by the scanner remotely via wireless technology or via a signal from a computer or cloud server. The storage container can be built into a structure, such as a house, located inside a column or other decorative structure, or can be free standing. The storage container or lock box can be equipped with a scanner.

According to an embodiment of the disclosure, the system can include a computer processor and a non-transitory computer readable storage medium comprising software having programming instructions that, when executed, cause a computer processor to carry out various steps described herein. According to an embodiment of the disclosure, the software can be adapted for use as an application on a mobile smart phone.

The software can enable a user to create a virtual key. The virtual key can be a bar code, a graphic image such as a photograph, and/or an alphanumeric code comprised of letters and/or numbers. In a preferred embodiment, the virtual key comprises a graphic image and an underlying alphanumeric code, and the scanner is adapted to read graphic images and alphanumeric characters. If weather or other issues prevent the scanner from being able to read the graphic image, the scanner can read the alphanumeric code. In another embodiment, the virtual key comprises a graphic image and an underlying code that may be used for authentication of the image, and the scanner is adapted to read graphic images and bar codes. If weather or other issues prevent the scanner from being able to read the graphic image, the scanner can read the alphanumeric code. When the scanner reads the virtual key it initiates one or more actions, such as unlocking an associated lock to allow access to a secured location or container, or transfer data to a computer processor or a cloud server to authenticate the key or perform the functions enabling access.

Notifications from the scanner can be sent wirelessly to the appropriate respondent enabling a remote signature receipt. The software application is capable of voice recognition. The software can create bar codes, images, and pictures and can forward them, such as by text or e-mail, to allow access to authorized visitors, deliveries, service personnel, and the like.

The software application can deliver a specific message for the specific bar code, image, picture and/or number(s) to input. The software enables remote programming of the scanner, lockbox, storage etc.

The software application enables remote two-way communication via wireless mobile devices. The software application coordinates the actions of all features of the system. The software application can receive data from a plurality of mobile devise or fixed devices via Internet, Wi-Fi, or other wireless or wired means.

The software enables the programmer to create a virtual key, which can be a unique barcode, character, picture, letter(s) and/or number(s). A corresponding virtual key is sent to designated recipient(s), such as delivery or service personnel. When scanned, access is gained, or a message is delivered from the system. The software allows access and messages to expire as programmed in accordance with each unique barcode, character, picture, letter(s) and/or number(s).

Each virtual key can be programmed to have a predetermined limited life span. Upon creating a virtual key, the user can select a predetermined date and time at which the virtual key will expire and no longer provide access.

The software can require a driver's license scan or card reader for the purposes of verifying entry. The software can time stamp every activation and document identity when desired. The software allows notifications to be sent to one or more mobile devices.

The software enables the person notified wirelessly to forward a unique barcode, character, picture, letter(s) and/or number(s) etc. to one or more recipients to provide access or messages.

The software can send a delivery confirmation to the sender, the delivery service and/or others involved. The software allows owners to change access according to need for residents or guests, thereby eliminating the need to change locks.

The software enables preprogrammed messages, directives to different individuals in accordance with the corresponding scan. The software enables a remote signature, symbol, and/or image to be sent from a handheld device to the system, enabling the delivery person to obtain such through the scanner or doorbell or other system apparatus.

The software can allow a mobile or stationary transmission of a barcode, image, etc. for the purposes of access, message and/or information. The software has voice recognition and artificial intelligence, enabling dissemination to appropriate users and interface with an authorized delivery person or guest. The artificial intelligence can provide information, directives, and/or greetings etc.

The software application enables all devices in the system to be synchronized in a secure manner by usernames and passwords or similar identification protocol. The system can be referred to as "Virtual Access Locator Technology" (VALT). The system comprises:

Scanner/Scanner/Doorbell/Light apparatus mounted in proximity to a door, lockbox, storage, compartment or other secured location or container.

Scanner can include illumination, camera, speaker, microphone, alarm, and reader(s) for cards, mobile phones, and mobile devices.

Controller comprised of a catalogue of keys for creation of a variety of selected inputs to be sent or transmitted to the scanner or to an individual(s) with a remote device or to an email address, or other address. Each virtual key, bar code, alphanumeric input has the capability of triggering a corresponding message, directive, etc. from the system when a scan is performed.

Controller(s) consisting of programmable devices (computer, laptop, cell phone, tablet etc.) running a software application controlling one or more systems of the disclosure.

Lock box(s), storage, compartments for storage of deliveries that interface with the controller and the scanner.

Software with a menu of features to customize the VALT system for uses such as managing construction sites and deliveries, providing remote contact by real estate agents with prospective buyers, forwarding an electronic code/virtual key for access utilizing the scanners, and serving property owners with a secure method of receiving deliveries.

A camera for monitoring package deliveries, recording access and egress, and date stamping time of events.

Two-way communication for wireless communication between person initiating scan and appropriate person(s).

Motion detection for activation of system or the pressing of a button.

if a delivery package requires a signature and the occupant is not home, the scan will enable the system to notify the occupant and an electronic signature can be forwarded to the deliverer as well as remote access triggered to a selected structure, such as a lockbox, storage, compartment.

An app enabling networking of artificial intelligence devices within or outside the Wi-Fi network.

An embodiment of the disclosure comprises a general-purpose computer that has been programmed to perform particular functions as a specific purpose computer pursuant to the instruction from program software, such as the software described above.

According to an embodiment of the disclosure, when a package, letter or other delivery is anticipated, the source of the delivery, which can be an online retailer, identifies itself as a VALT application member enabling the source to select delivery options which may include the provision of a virtual key to the retailer or carrier for delivery. The owner may designate specific delivery instructions, access, and/or access points for each delivery. The virtual key can be a predetermined bar code(s), graphic image(s), and/or other access authorizing input. When the purchaser receives the access authorizing input, that input is entered into the VALT system. The delivery source can also provide the authorizing delivery input (virtual key) to a delivery person responsible for delivering the package, letter, or other delivery to the purchaser. Alternatively, the purchaser can provide the virtual key to the delivery person. The VALT system stores the authorizing input until an anticipated match is received from a delivery person (bar code, image, numbers, etc.).

The VALT system scanner scans the input from the delivery person to determine if it matches the authorizing input that had been entered by the purchaser. When a match occurs, the VALT system is triggered to initiate one or more of the following actions:
- Provide access (such as by unlocking a door or container)
- Deliver a preprogrammed message to the source of the delivery
- Establish contact with appropriate individual(s)
- Date stamp delivery
- Notify appropriate individuals of delivery (such as the intended recipient)
- Initiate two-way communication
- Activate camera
- Activate motion detection
- Activate the artificial intelligence device which will then interface with the VALT system providing instructions, directives, etc.

In an alternative embodiment of the disclosure, the intended recipient can create the authorizing input, such as a bar code(s) or image(s), and the intended recipient sends the authorizing input to the delivery source. For example, an individual can create a personalized authorizing input that the individual can provide to an online retailer at the time of making a purchase from the online retailer.

According to an embodiment of the disclosure, a system administrator has the ability to create barcodes, images, etc. or other authorizing inputs that can be sent for the purpose of access:
- Deliveries
- Guest
- Family
- Real Estate Sales
- Service and repair personnel
- Property management
- Online real estate rental platforms, such as Airbnb An administrator/owner can create label and provide the label to a number of vendors. The label can be created by the sender using identified numbers or codes provided by the sender such as credit card number, number provided by administrator/owner at the time of order, and/or image selected by the administrator/owner at the time of order.

According to an embodiment of the disclosure, the VALT system has the capability of sending a signal to a variety of access points. One of which can be mail compartments, storage compartments, entry, or other. Once access is provided, the access information becomes invalid, or programmed to expire at a designated time.

The VALT system can include the ability to deliver messages or information associated with each scan. The system can also include voice recognition and AI (artificial intelligence), either built in or networked with other external AI devices, enabling it to conduct inquiries, provide information, and respond to inquiries.

The VALT system can be connected to a data base for the purpose of reading drivers' licenses or other Identification cards or badges. The VALT system date stamps, stores and configures a report of all activity. The VALT system confirms deliveries, date stamping each, and provides access to package containers, storing them safely.

According to an embodiment of the disclosure, the two-way communication enables remote communication with the owner/administrator and the person triggering the scan.

Locking compartments or storage compartments for the VALT system can be built in the structure or located in proximity to a structure in range of the VALT wireless input, the cloud server running the application, or a mobile device running the application.

In select embodiments, the VALT system comprises a scanner device, such as the AI entry management device 10 described above. Upon the purchase of an item from an online retail seller platform, a virtual key is created and transmitted to the AI entry management device 10 of the item purchaser. The virtual key can include the specific IP address of the purchaser. The virtual key is also sent to the designated retailer or delivery service that is to deliver the item to the purchaser if a VALT membership is confirmed. Upon delivering the item to the purchaser's location, the delivery service presents the virtual key, which can be a bar code that is scanned by the doorbell device. Upon scanning the virtual key, the VALT scanner AI entry management device 10 transmits a signal to the application server, computer processor or door lock that unlocks the door 112. The VALT system can program the virtual key so that it expires after a predetermined number of uses at the AI entry management device 10. For example, the virtual key can expire after it has been scanned one time by the AI entry management device 10. As such, the virtual key cannot be used again. Alternatively, the virtual key can be programmed to activate at a predetermined time and expire at a predetermined time.

According to an embodiment of the disclosure, the VALT system can be used in the field of real estate sales. Real estate agents can send access information wirelessly in the form of a bar code or image to a potential buyer visiting a home for sale. The potential buyer can input the access information into the system to unlock the door of the home and gain entrance. The VALT system can also confirm the identity of the potential buyer via driver's license scan. The system can monitor access via built in camera(s), conduct remote tour via interior cameras and monitor exit. The VALT system can be used with online real estate rental platforms, such as Airbnb.

In another embodiment of the disclosure, the VALT system can be used to receive service providers at a location, such as building contractors, sub-contractors, repair men, cleaning staff and other service personnel doing work at a residence. The homeowner can use the system to create access information and provide the information to the service providers who input the information into the system to gain access to the residence.

Another embodiment of the disclosure comprises a mobile app that allows for the creation of a virtual key to enable the transfer of keys for accessing a structure.

According to an embodiment of the disclosure, the VALT system comprises an artificial intelligence (AI) device and AI entry management device 10 having camera 22 that can be used as a scanner and a mobile app that can be utilized by merchants. The mobile app allows the transfer of specific barcode or other information. Also, included in the app is the ability to create virtual keys which may be sent to delivery personnel or service people. An unlocking component is associated with the creation of the virtual keys.

According to an embodiment of the disclosure, the virtual key expires at a predetermined time selected by the creator of the virtual key. The virtual key can be securely sent to a cell phone for access by various personnel.

In another embodiment of the disclosure, multiple artificial intelligence (AI) devices communicate with one another in an established network. This allows messages to be shared, transmitted, and stored in other AI devices for both security and information purposes. If a delivery occurs and the recipient or occupant is not available, the VALT system communicates with the AI device with a notification that may be stored or sent to another AI device. According to an embodiment of the disclosure, membership in the network can be accepted via programming of a code, IP address, or some other identifier that can be accepted by another device or devices for shared communication. The information may extend to the merchant who has the ability to send a message to an AI device regarding delivery, shipping, or order information. The AI device may also communicate instructions to the delivery person via the VALT scanner or independently, in addition to storing important information from a delivery or service person.

Another embodiment of the disclosure comprises a system for delivering merchandise comprising an online membership platform on which a user, at the time of creating a membership, enters personal data, such as name, address, and credit card information. The user can create a virtual key, and enter special instructions for delivery personnel, such as the user's preferred location for leaving packages. The membership platform can be accessed at the time of making an online purchase. For example, an online retailer can make customers aware of the membership platform and provide a link to the platform when customers are about to make a purchase from the online retailer. Returning customers who have already created a membership can enter a password to bring up their existing membership. The system includes a scanner device that can read bar codes, images, and alphanumeric symbols. The scanner device can be encoded with the personal data of a particular user, including the user's "virtual key." The online retailer delivers the encoded scanner device to the particular user when the user creates a membership on the membership platform.

The user positions the scanner device proximate an access door of the user's home, business or other location to which the user has purchased from the online retailer is to be delivered. The scanner device can include adhesive or other attachment means that allows the scanner device to be securely attached to the user's home, storage container or other secure location. The scanner device can include a speaker, microphone, a display screen and a camera. Preferably, the display screen is a touch screen. When a delivery is scanned, confirmation of receipt of the package is transmitted to the online retailer and the user. Upon scanning of the package, the scanner device reads the virtual key.

If the user entered special delivery instructions on the membership platform, the instructions (such as "place the package on the back porch") can be broadcast audibly via the speaker and/or presented visually as text on the touch screen. If the delivery service personnel have an issue and wishes to communicate with the user, he can do so using the microphone. The online retailer can offer an "upgraded" scanner device that includes means for installing an electronic lock on the user's access door that is operatively connected to the scanner device. Upon scanning of the package by the scanner device, the scanner device reads the virtual key, which triggers the electronic lock on the access door to unlock for a predetermined amount of time to allow the delivery service personnel to place the package inside the user's home.

According to another embodiment of the disclosure, the VALT application can maintain a record of every activation and access key. A record is maintained of each activation that includes the virtual key utilized for the activation, the IP address and authorized user of the mobile device of the individual and/or entity utilizing the virtual key for access, the duration of stay, and the date/time of departure and/or termination of the virtual key.

According to another embodiment of the disclosure, the VALT application can include voice recognition technology and the virtual key comprises an audible recording of a series of numbers, words and/or sounds, which can be created by the administrator. The voice recognition technology can be operatively connected to the scanner device whereby the scanner device is adapted to receive and process voice data. When the scanner device receives and processes the audible sound of the virtual key one or more actions can be initiated, such as unlocking a door to a structure and/or providing a greeting and/or logistics information.

According to another embodiment of the disclosure, access to the VALT application can be protected by biometric recognition of the user. Access to the VALT application is granted when certain biometric data of the user is authenticated. Authentication can be achieved by scanning fingerprints and/or other physical features of the user.

According to another embodiment of the disclosure, the VALT system can include a secondary power source that enables the system to continue working in the event of a power outage. The secondary power source can (a) serve as a backup power source, (b) charge a battery capable of powering the system when electricity is not available, and/or (c) contain a backup energy/power device capable of powering the system. The secondary power source can comprise one or more solar (photovoltaic) panels.

According to another embodiment of the disclosure, the virtual key can trigger a drone device that retrieves a package and takes it to a designated storage area. Rather than the virtual key being used to access a structure, the key activates a drone device that flies to the delivery area and retrieves the package when the key is scanned.

Another embodiment of the disclosure comprises a system that can be referred to herein as "Mapping and Locator Technology" (MALT). The MALT system can be an optional or additional feature of the VALT system. In accordance with the MALT system, a global navigation satellite system, such as The Global Positioning System (GPS), is used to interface with multiple devices to initiate access and/or activate messages or logistics when devices are within a particular range of distance between each other. The particular range of distance necessary to initiate access and/or messages or logistics can be entered into the MALT system. The range of distance can be for example five feet, or it can be greater or less. The GPS detects the geo-location of each device, and when it is determined that the multiple devices are within the particular range of distance of each other a number of different actions can be initiated, such as granting access to a structure and/or activate messages and logistics.

The MALT system, utilizing a standard GPS service, can establish a relationship between a host device and one or more mobile devices running the VALT application. The mobile devices can be mobile smartphones. The host device comprises a computer processor and is linked to each mobile device using the IP address of each mobile device. The host device can be an artificial intelligence device. When the mobile device comes within proximity of the host device, the host device initiates one or more actions, such as providing access to a structure and/or providing a greeting and/or logistics information. This feature eliminates the need for optics and/or near-field communications (NFC). When utilized in delivery services it enables the carrier to simply arrive and come within proximity of the host device.

In another embodiment, the MALT system, utilizing a standard GPS service, can establish a relationship between a mobile device and a specific landmark or address. When the mobile device is within proximity of the specific landmark or address, access or logistics are activated utilizing. The mobile devices can be mobile smartphones or a carrier's diad (mobile device) which can be utilized for access and logistics. This feature eliminates the need for optics and/or near-field communications (NFC). When utilized in delivery services it enables the carrier to simply arrive and come within proximity of the landmark or address.

The MALT system can interface with devices of VALT members. Information and logistics can be programmed into each carrier's mobile device and when the carrier's mobile device is within proximity of a landmark or address, access and directives are initiated.

According to a preferred embodiment, the MALT system can utilize a virtual key for added security. The host device can be the AI entry management device 10 described above. The AI entry management device 10 is linked to a mobile device using the IP address of the mobile device. In addition, a virtual key can be created and transmitted to the linked mobile device. When the mobile device comes within proximity of the AI entry management device 10 and the virtual key is read by the AI entry management device 10, the host device initiates one or more actions, such as unlocking the door to the structure operatively connected to the AI entry management device 10 and/or providing a greeting and/or logistics information. In order to initiate the action, the linked mobile device must be within the particular predetermined range of distance of the AI entry management device 10 and the AI entry management device 10 must read the virtual key from the mobile device. This provides an added layer of security. The virtual key can be a bar code, a graphic image, such as a photograph, and/or an alphanumeric code comprised of letters and/or numbers. Preferably, the virtual key comprises a graphic image and an alphanumeric code. If weather or other issues prevent the AI entry management device 10 from being able to read the graphic image, the AI entry management device 10 can read the alphanumeric code.

In a method according to a preferred embodiment of the disclosure, the MALT system can be used in a delivery process. When delivery of an item, such as package or letter, is anticipated, a virtual key is created and transmitted, such as by e-mail or text, to the delivery service responsible for delivering the item. The virtual key preferably comprises a graphic image and an underlying alphanumeric code. The virtual key can be created by the recipient of the item by taking and selecting a photograph and entering a series of alphanumeric characters. Alternatively, the virtual key can be created by the seller of the item to be delivered, and the seller transmits the virtual key to the recipient and the delivery service responsible for delivering the item. The delivery service transmits the virtual key to the mobile device of the delivery person delivering the item. In addition, the delivery person's mobile device is linked to the recipient's AI entry management device 10 via the IP address of the mobile device. The AI entry management device 10 is provided at the home of the recipient. The AI entry management device 10 can be operatively connected to an access point of a structure, such as the front door of the recipient's home whereby the AI entry management device 10 can lock and unlock the front door. When the delivery person arrives at the recipient's home, the delivery person presents the virtual key on his mobile device to the AI entry management device 10. When the AI entry management device 10 detects that the delivery person's linked mobile device is within the required range of distance and reads the virtual key on the mobile device, the VALT system initiates one or more actions, such as provide access (such as by unlocking the front door), provide a preprogrammed message to the delivery person, contact the recipient or other appropriate individual(s), date stamp delivery, notify appropriate individuals of delivery (such as the intended recipient), initiate two-way communication between the recipient and the delivery person, activate the camera, activate motion detection, and activate an artificial intelligence device which interfaces with the VALT system providing instructions, directives, etc.

The MALT feature can be activated or canceled via the VALT application. VALT offers at least two levels of authentication and convenience: (1) image identification with a code to prevent the forwarding or transfer of the image, and (2) code detection via NFC for the purposes of verifying the image code. The use of GPS makes deliveries interactional and intuitive by providing immediate access and/or information or directives.

Figure 9:
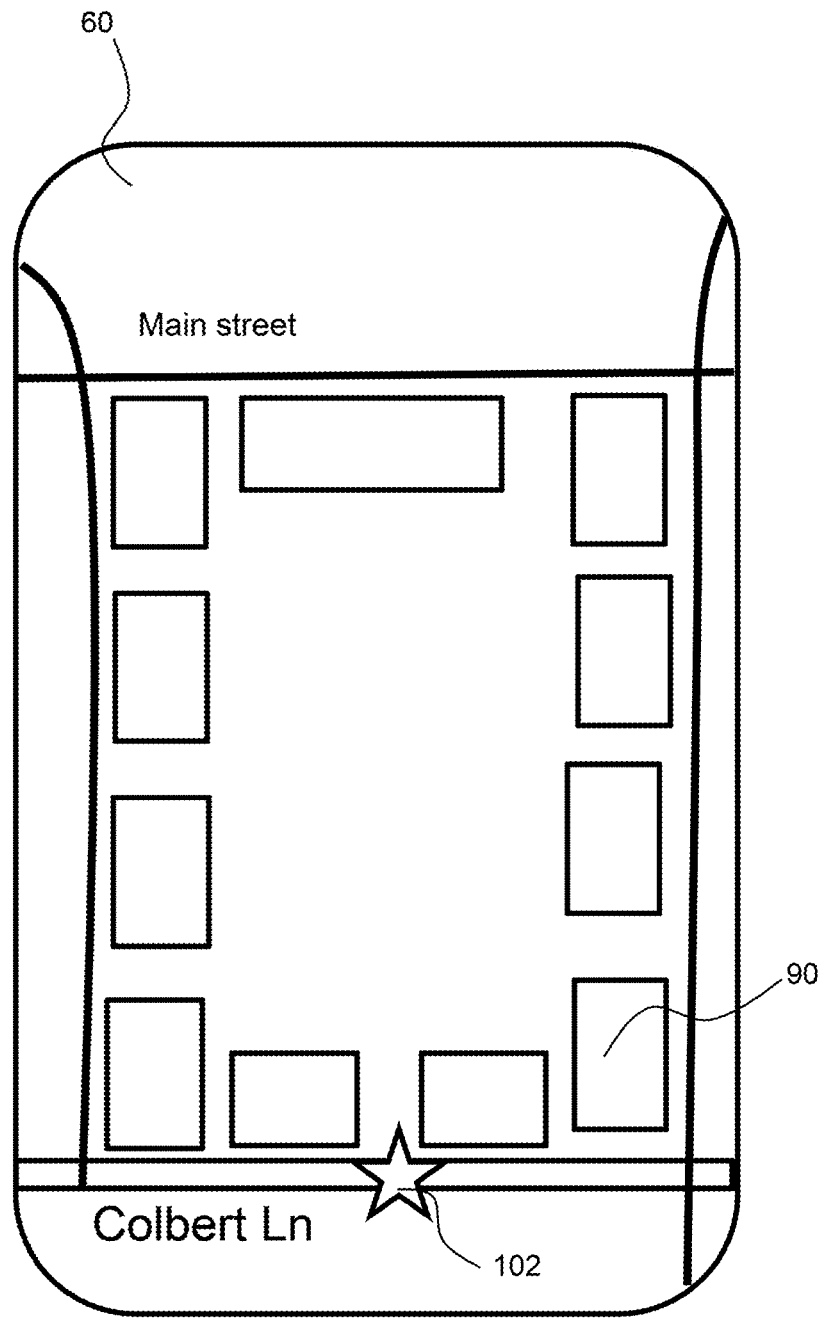
FIG. 9 shows a display screen showing the artificial intelligence entry management system tracking a mobile electronic device, such as a mobile phone, of a third party to enable a contextual greeting and to provide logistic instructions to said third party when their mobile device moves within a threshold distance of the artificial intelligence entry management device.

Mobile electronic devices and GPS provide advantages over GPS and vehicle location. The VALT application can use GPS to provide delivery confirmation when the mobile device of the carrier and the VALT host are in proximity. As shown in FIG. 9, a mobile electronic device 60 may be tracked by the AI entry management device system, wherein a location of a mobile electronic device 102 of a third party 102, such as a mobile phone or beacon with respect to an access point 90, as represented by display 15 of the AI entry management device system, as an example. It is to be understood that the tracking may be accomplished without any display output, however the display 15 may be provided on the AI entry management device 10, and/or on the third party's mobile electronic device and/or an administrator's mobile electronic device. The AI entry management device system 100 may provide a contextual greeting when the third party's mobile electronic device moves within a threshold distance from the AI entry management device 10, such as within about 20 m or less, about 10 m or less, about 5 m or less and any range between and including the threshold ranges provided. The contextual greeting may include the name of the person associated with the third party mobile electronic device or the name of a company that they are associated with. The artificial intelligence entry management system may provide a greeting a logistic instructions for delivery of a package, such as "Hi UPS driver, please place the package in the storage container on the porch." It is to understood that this tracking and display feature may be provided and/or accessed by an administrator on an electronic device including a mobile electronic device. Furthermore, the display on the AI entry management device may also show the location of a tracked delivery person, as shown. A person may pull up the location of a deliver person before leaving or entering their home to know when to expect a delivery.

Figure 10:
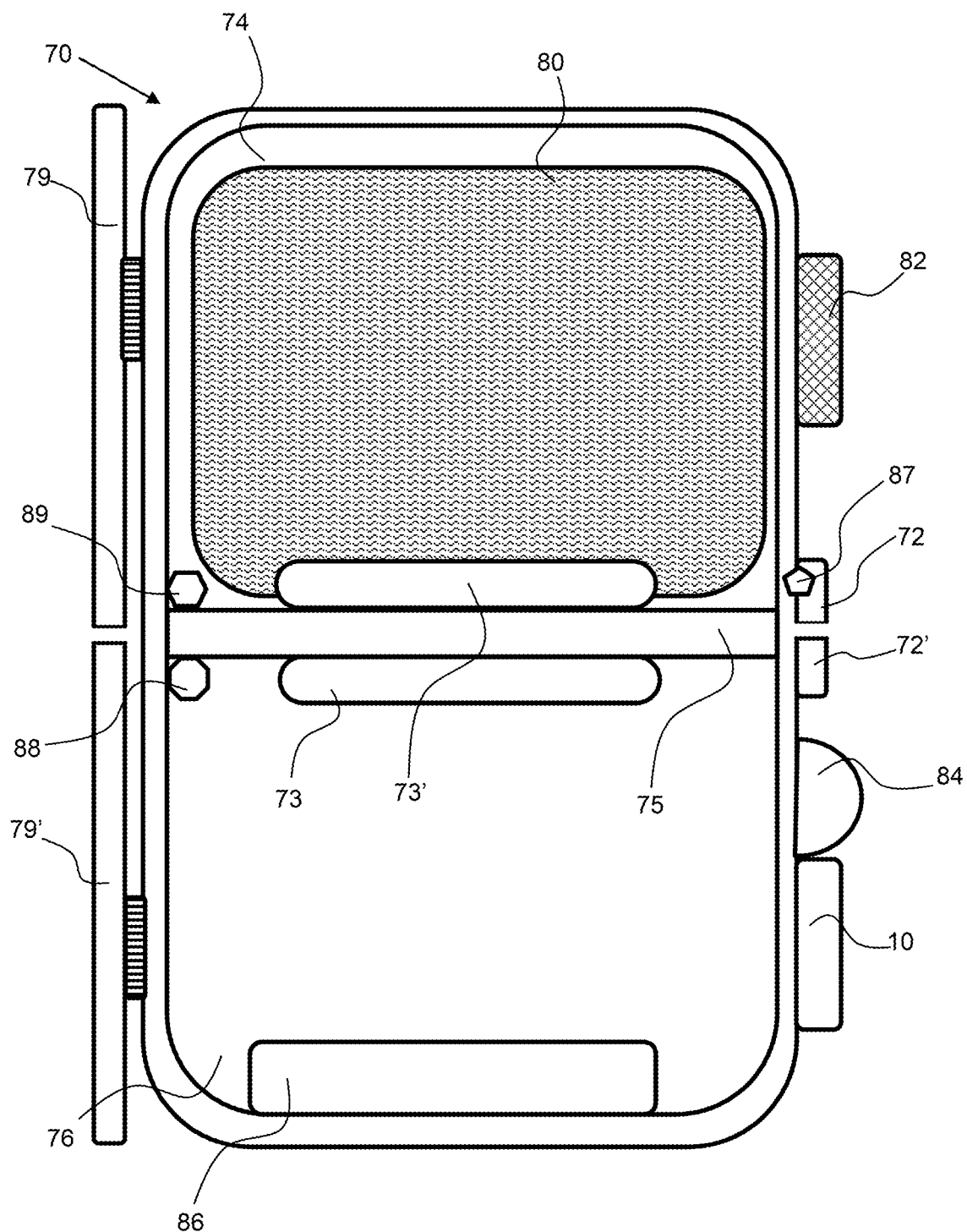
FIG. 10 is a top view of an exemplary storage container having two compartments therein.

As shown in FIG. 10, an exemplary storage container 70 has a first compartment 74 and a second department 76 formed by a divider 75. The first compartment has a heating device 80 and the second compartment has a refrigeration device 86. Also, the UV lights 73, 73' are configured to produce a disinfecting UV light used to disinfect packages and contents within the storage container. The storage container 70 is also configured with a lock, which is an electronic lock that is unlocked and locked by the AI entry management device system when a virtual key is verified. The storage container also has a light 84 and a speaker 82.

The light may be used to aid in finding and opening the storage container, when used after dark and the speaker may be used to emit audible phrase from the AI entry management device system, such as logistic information. It may direct the delivery person to place a package in a specific compartment of the storage container, for example. Also, the speaker and light may be used as an alarm in the event the storage container is jostled or moved or in the event that the storage container is opened without authorized access.

Figure 11:
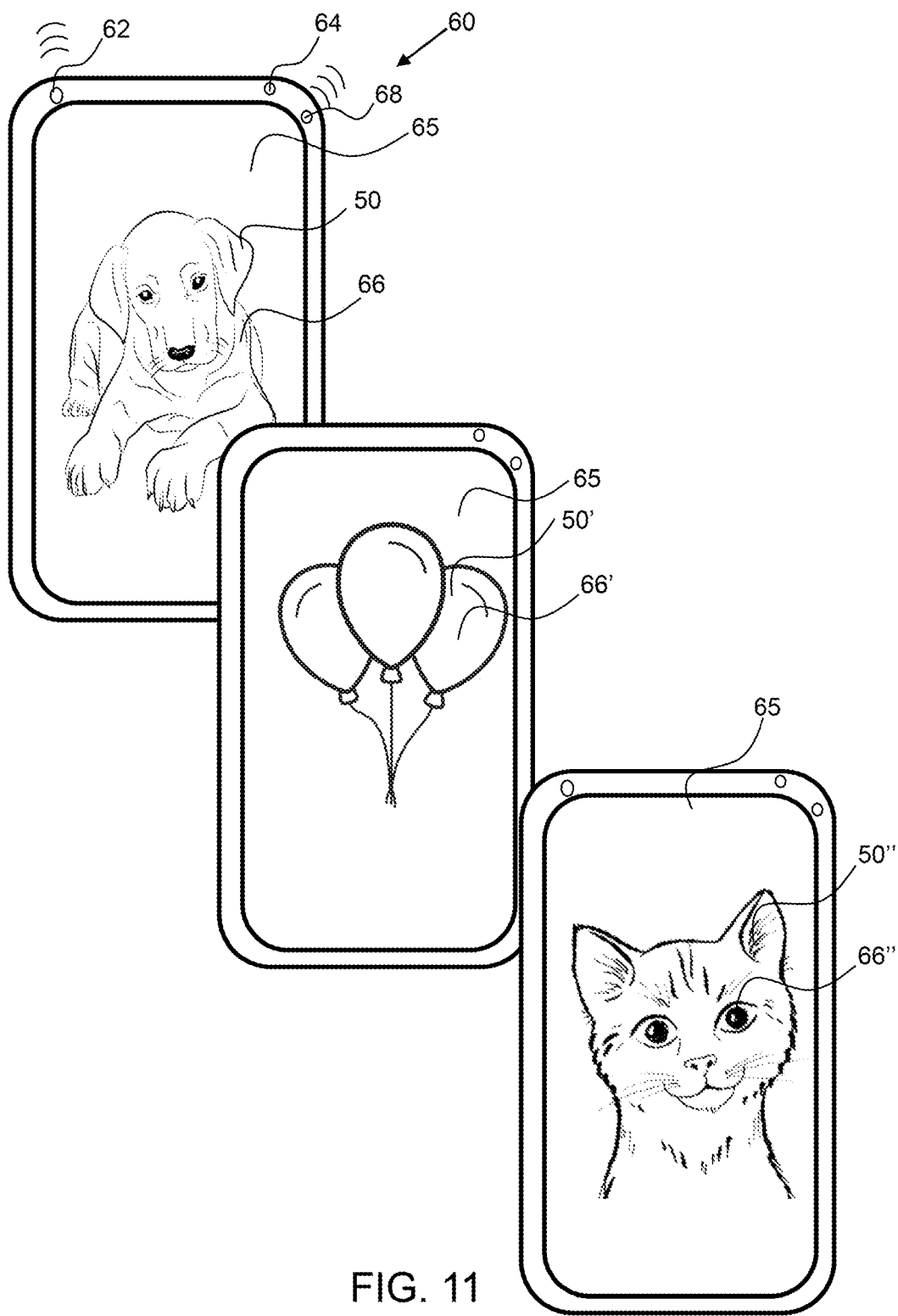
FIG. 11 shows a front view of a mobile electronic device that displays a plurality of digital photographs that in series are an image virtual key configured to be identified by the camera of the artificial intelligence entry management device and verified for access to an access point.

As shown in FIG. 11, a mobile electronic device 60 is configured to display a plurality of digital images 66, which may be digital photographs that, in series, are an image virtual key 50, 50', 50" configured to be identified by the camera of the artificial intelligence entry management device and verified for access to an access point. A user may receive a plurality of digital images or photographs from an administrator of the entry management system, which may all be in a single file or separate files, and the user may then display the virtual key images to the camera of the entry management device in sequence, dog, balloons, cat, for example. The artificial intelligence entry management system may be configured to unlock a lock when a virtual key is verified by the AI entry management device.

Figure 12:
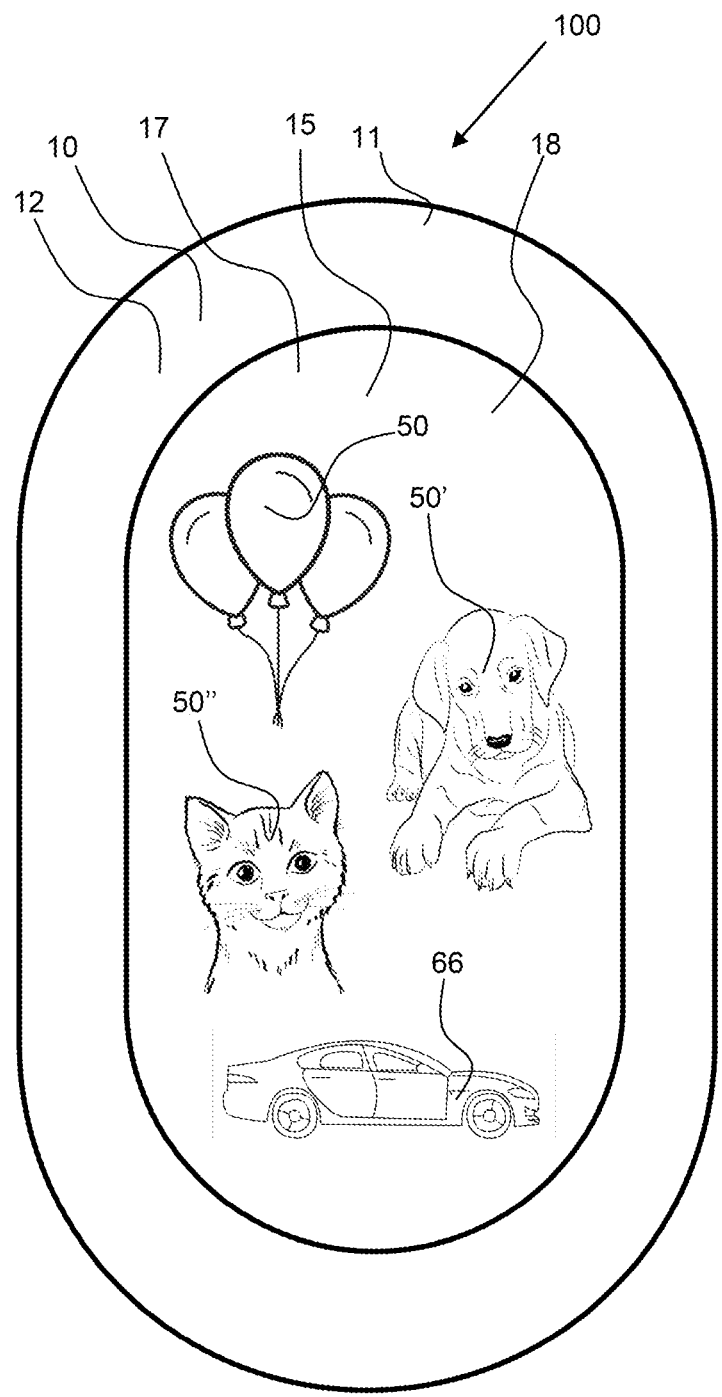
FIG. 12 shows a front view of an exemplary artificial intelligence entry management device having a display screen that displays images for selection as a selected virtual key.

As shown in FIG. 12, an exemplary artificial intelligence entry management system 100 may require a virtual key to be selected on a display screen 15, from a plurality of digital images 66, before a lock is unlocked. The artificial intelligence entry management device 10 may have a display screen 15 that may also be a touch screen 17 that enables a user to select one or more digital images for entry. The user may have to select a plurality of digital images to produce a virtual key and the image virtual key may require each image virtual key 50, 50', 50" to be selected in a specific sequence, such as balloon, dog, cat, for example. A plurality of other digital images 66 or photographs may also be displayed on the display screen during the selection or entry of the virtual key. Again, a system administrator, or the artificial intelligence entry management system may automatically, send an image virtual key. The user may view the virtual key on their electronic device and then use the touch screen to select these images. The artificial intelligence entry management system may send image virtual keys to a user when they are expected to arrive, such as to a cleaning professional prior to their weekly scheduled arrival.

Figure 13:
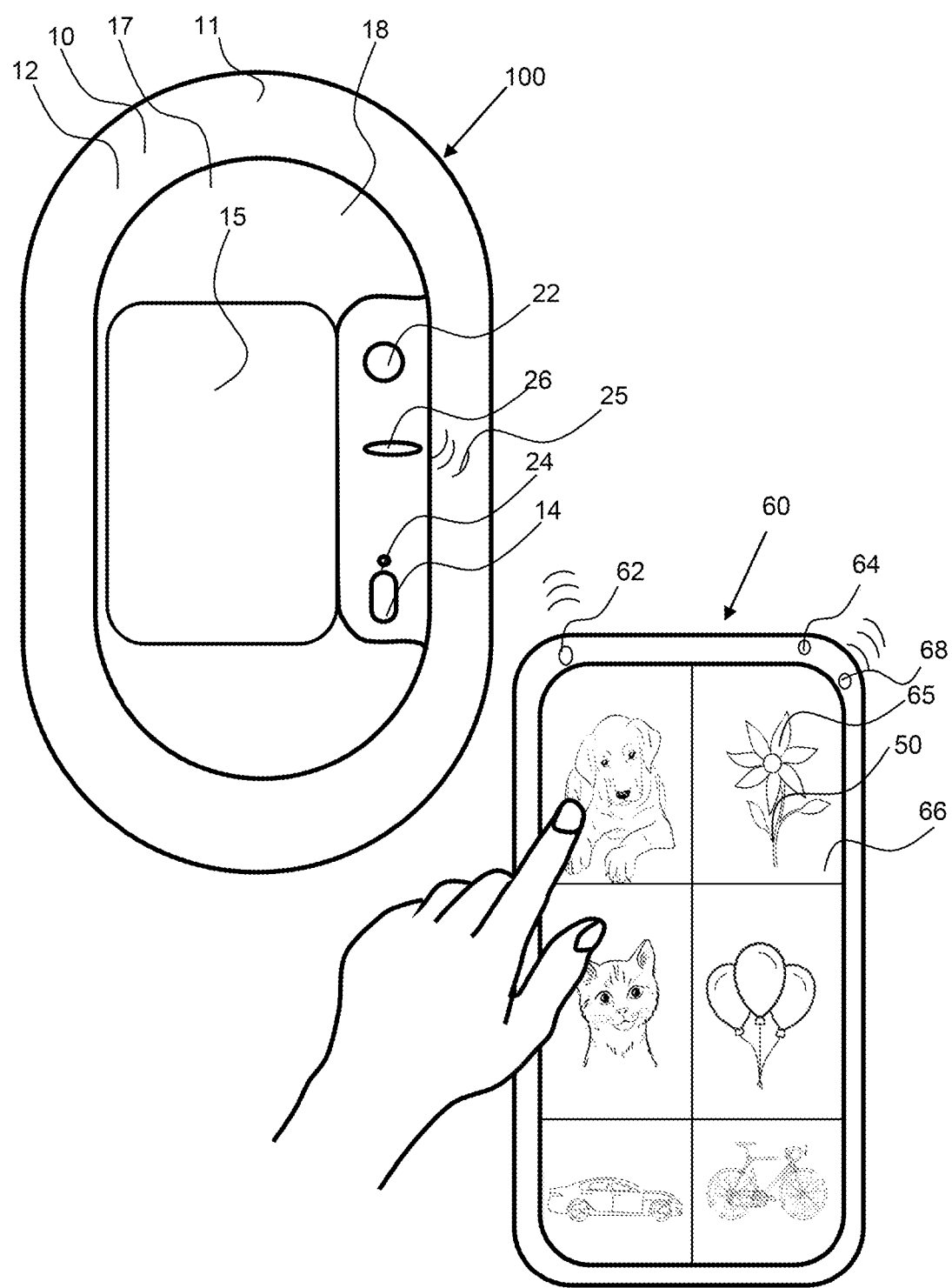
FIG. 13 shows a front view of an exemplary artificial intelligence entry management device communicating with a mobile electronic device to present a plurality of images for selection to produce an image virtual key for access to an access point.

As shown in FIG. 13, an exemplary artificial intelligence entry management system 100 may require a virtual key to be selected on a display screen 65, of a mobile electronic device 60, from a plurality of digital images 66, before an access point is unlocked. The artificial intelligence entry management device 10 may communicate with the mobile electronic device through a wireless signal 25, such as a Bluetooth signal and send a plurality of digital images for the person to select on their own mobile device to enable entry to an access point. The plurality of digital images may be configured in a grid and may include one or more images that were sent previously to said person via the artificial intelligence entry management system. The person may then select the images when they approach the artificial intelligence entry management device 10. The user may have to select a plurality of digital images to produce a virtual key and the image virtual key may require each image virtual key 50, 50', 50" to be selected in a specific sequence, such as balloon, dog, cat, for example. A plurality of other digital images 66 or photographs may also be displayed on the display screen 65 during the selection or entry of the virtual key. Again, a system administrator, or the artificial intelligence entry management system may automatically, send an image virtual key. The user may view the virtual key on their electronic device and then use the touch screen to select these images. The artificial intelligence entry management system may send image virtual keys to a user when they are expected to arrive, such as to a cleaning professional prior to their weekly scheduled arrival.

The artificial intelligence entry management device 10 may be configured on the storage container and may have a speaker and camera configured to interface with the person to scan a virtual key and provide access to the storage container and/or another access point. An exemplary storage container 70 may comprise a closure sensor 87 that detects the position of a storage container closure, such as a lid or door. In the event the closure is opened without authorization, the light 84 and/or speaker 82 may be activated to produce an alarm. Also, an exemplary storage container may have an accelerometer 88 that detects motion and when the motion above a motion threshold is detected, an alarm may be activated on the storage container and/or entry management device. An exemplary storage container may have a global positioning system (GPS) location device 89 that is used to monitor a location of the storage container and when the storage container is moved beyond a perimeter limit or a threshold distance from a location, an alarm may be activated on the storage container and/or entry management device. These theft prevention measures may help to ensure that packages delivered into a storage container and the storage container are not stollen.

Figure 14:
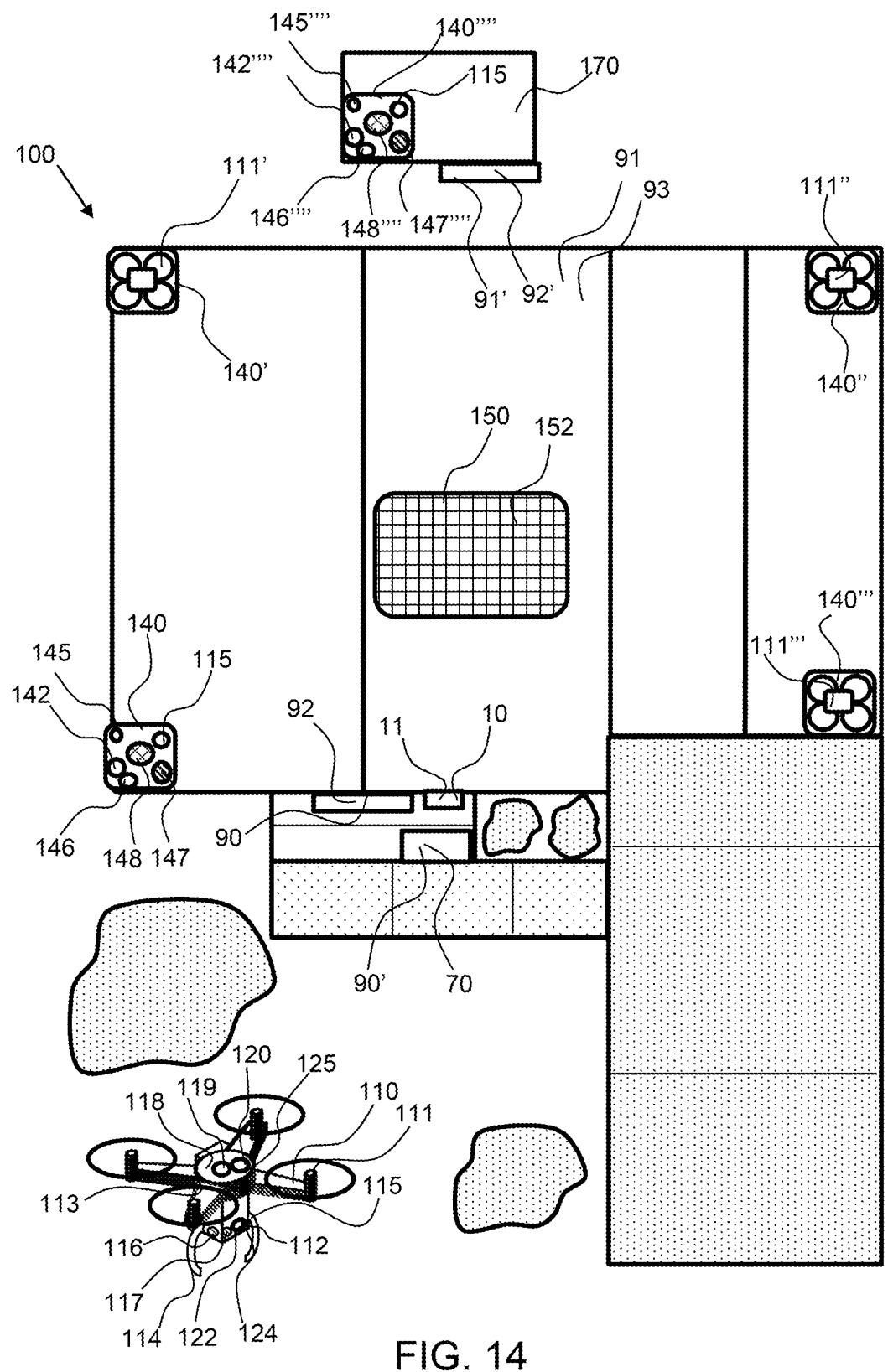
FIG. 14 shows a top view of a building, a dwelling, having robot docking stations configured on each corner of the building to provide substantially complete monitoring of the perimeter of the building.
Figure 15:
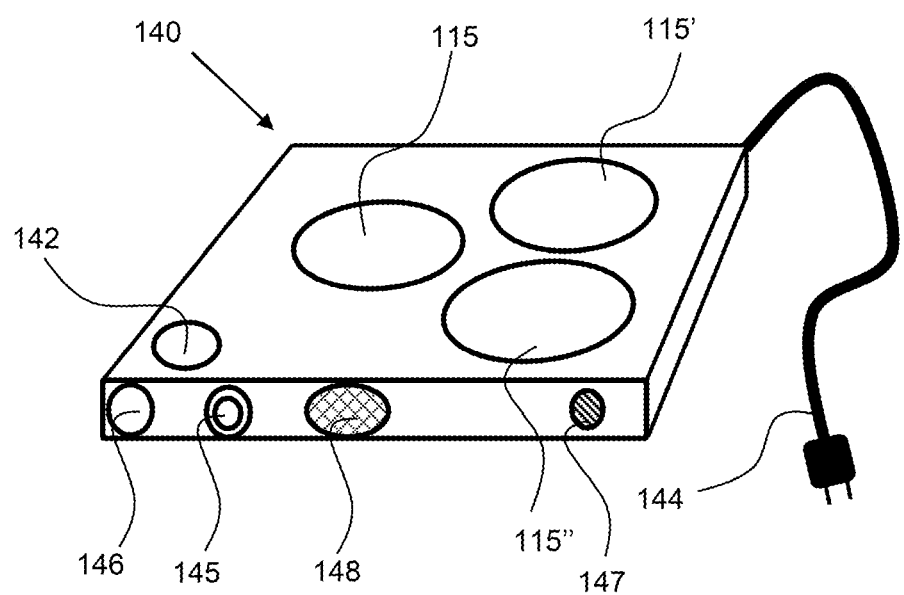
FIG. 15 shows an exemplary docking station having a plurality of batteries and a charging interface for charging a robot docked thereon.

Referring now to FIGS. 14 and 15, an exemplary artificial intelligence entry management system 100, comprises an artificial intelligence entry management device 10 an access point 90, the front door to the home and 90' a storage container 70, as well as a plurality of robots 110, aerial robots 111, 111', 111" and 111'" that are configured to dock on corresponding docking stations 140, 140', 140" and 140". The docking stations are configured to provide power to the robot via a charging port 142 and/or interchangeable batteries 115, 115', 115". A battery on the robot 115 may be charged by the charging port 142 when the robot is docked on the docking station 140, and/or the battery on the robot may be interchanged with a battery of the docking station. The power for the charging of the batteries may be from a power source of the building, such as from a power line 144 that is plugged into or otherwise coupled with the building electrical power system. The power may also come from a renewable power source, such as a solar panel 152. The power generated from the solar panel may be coupled directly with the docking station(s) and may be configured on or near the docking stations.

Four of the docking stations are configured proximal to the corners of the building to provide substantially complete perimeter monitoring via the camera 112, motion detector 120 and/or microphone 117 on the robot 110, such as the aerial robot 111. Also, the docking station 140 may include a camera 145, motion detector 146, microphone 147 and/or a speaker 148. The docking station may also effectively monitor an area around an access point, such as around a perimeter of a home or business. The docking station may emit an alarm when motion is detected or when a threat is detected by the robot or docking station. In the event that the camera on either the robot or the docking station detects motion for example, the areal robots may be deployed from the docking station to investigate more closely by flying to be in closer proximity to the source of the motion and/or sound. An alert may be provided to the intelligence entry management system 100 and images and audio received by the microphone, of the robot or docking station, may be transferred in real time to the intelligence entry management system 100 for an administrator to review. Also, the access points may be locked in the event that any motion or sound above a threshold amount is detected. The robot may act autonomously when monitoring the perimeter of the building and may interface with the intelligence entry management system 100 only when the detected sound or movement is determined to be threat. A robot may be configured for surveillance or a property or an area around a building or access point and may use a camera to detect motion and a microphone to detect sound. The robot(s) may act independently to monitor, record events detected and/or follow a threat or person that is detected.

A docking station 140"" may be configured on the ground or on another structure 170 detached from the building 93, such as a dwelling 91, having an access point 90, such as a door 92. This structure 170 may also include an access point 90', such as a door 92' and may be a shed or other dwelling or building. The structure may also be specific for docking and be configured proximal to the ground for servicing.

A robot may be activated to begin surveillance by the system, or by a separate mobile device. A person may activate the robot(s) to monitor an area around their home when they leave, for example. A robot may interface with any smart-home system, a system configured to lock and unlock doors for access to a building, such as a home and place of business. A smart-home system may have an artificial intelligence entry management system as described herein. A robot may be controlled by the smart-home system, wherein they receive instructions through a wired or wireless connection with the smart-home system to perform a function. A robot may have some autonomous functions, such as surveillance, monitoring and capturing images and sound recordings. Also, a robot may act independently to follow a threat to record images of said threat and/or vehicle.

One or a plurality of the robots and in particular aerial robots may be configured to monitor and track a threat, such as an unauthorized person on or around an access point. The robot or robots may be deployed from a docking station and follow the threat for closer surveillance. The robot(s) 110 may activate the robot light 119 to deter the threat. The light may flash and may be a bright light, such as more than 500 lumen or more than 1,000 lumen. The light may also flash rapidly such as about 1 hertz or more, or about 2 hertz or more, about 5 hertz and any range between and including the cycles per second provided. This bright rapidly flashing light may effectively deter the threat. Also, the robot or robots may emit an alarm by the robot speaker 116 and this alarm may be directed at the threat via the directional speaker capability as described herein. The alarm or siren may be loud such as about 75 decibels or more, about 100 decibels or more, about 120 decibels or more and any range between and including the sound levels provide. The docking stations may also be activated when a threat is detected and emit a bright light and also an alarm having the lumens and decibel levels, respectively, or even higher lumens and decibels. A first robot may detect a threat and the robot may communicate with one or more additional robots to enable additional robots to find the threat, such as by communicating a location of the first robot. The robots may have GPS location and may use this to ensure that they do not collide with one another. A plurality of aerial robots may create a robot swarm around a threat to effectively deter the threat. The robot swarm of flying aerial robot may also further include one or more of the aerial robots emitting a light deterrent and/or sound deterrent.

A robot may have a physical deterrent 122, or a deterrent that is carried by the robot and delivered to the threat, such as being projected at a threat, such as pepper spray 124, a stunning device 125, a net, a projectile such as a bullet, a fluid such as a dye or foul smelling fluid. One or more of the robots, such as an aerial robot may dispense pepper spray at a threat to effectively deter the threat from proceeding. When a dye is dispensed by a robot on a threat, the dye may help authorities to later identify the threat as they leave the area. A stunning device may include electrodes to deliver an electrical shock and this may disable the threat temporarily. The robot may project the electrodes at the threat or may deliver the electrodes to the threat, such as by intercepting with the threat. An aerial robot may fly into the threat with an electrode armed to deliver the stunning and immobilizing electric shock. Likewise, a robot may project a net over a threat. When the threat is disabled by the pepper spray, a stunning device, or by a net, an administrator and/or the authorities may be contacted by the artificial intelligence entry management system, including directly by the robot. A very bright light, or flashing light, as well as an alai in or siren may also be a deterrent that is projected at a threat, as described herein.

A robot may be weaponized to do bodily harm and may be configured with a weapon, such as a gun to shoot a projectile into a threat, or a piercing object, such as a knife or spear. A robot may be configured to project the bullet, knife or spear at the threat from a distance, or delivery a projectile to a threat when they intercept the threat, such as by flying into the threat. A small charge may project a bullet into the threat when the aerial robot intercepts the threat. A knife or spear may be retractable and may be deployed prior to intercepting with a threat.

A home owner having an artificial intelligence entry management system may activate a monitoring and surveillance by the robot or robots using a mobile device and this may directly initiate the monitoring by the robots or may initiate the monitoring through the artificial intelligence entry management system or device. The robots may be configured to travel in a programmed path in a routine manner to provide improved surveillance of the premises. An administrator may program the robot or robots to fly around the building, such as a home every 10 minutes, or have one of the aerial robots flying in a prescribed path while the other robots remain stationed on their docking stations. The robots may alternate which one is conducting a surveillance route, such as a surveillance flight path around a building, for example.

A robot may be configured within a building, such as within a home and may be configured to open an access point, such as the door for greeting a person or visitor or delivery person. The robot may produce an audible greeting to the person and this audible greeting may be a customized greeting as the artificial intelligence entry management system open another access point for delivery of a package or give logistic instruction to the person. The robot may take a package from the person and deliver the package to an access point such as to a storage container or inside of the home, behind a door which may be an access point. The robot may be configured with a camera to scan a package including an address, or code, such as a bar or QR code to determine what the appropriate action should be with respect to the package. The artificial intelligence entry management system in combination with the robot(s) may act as a security system around an access point, such as around a home or storage container.

Data recorded by the artificial intelligence entry management system including images, including still and videos, and audio recording captured by the artificial intelligence entry management device or robot(s) may be stored on a SIM card or a local data storage device, and/or may be uploaded to the cloud for safety and security. An administrator and/or authorities may review recorded files to identify a threat or a threat's vehicle. As described herein, the robots may be programmed to capture images of license plate and/or other identifying features of a threat or a threat's vehicle.

The GPS application can comprise a device capable of being tracked by GPS. The device can be a mobile device or other device capable of being tracked by GPS. When the GPS device and the host device are in proximity, access and/or messaging and logistics can be triggered. The host device can be an artificial intelligence device. The robots may include a GPS application.

According to another embodiment of the disclosure, access and/or messaging is triggered when a linked mobile device is within a predetermined distance of a particular address. In such embodiment, a host device is not needed.

According to another embodiment of the disclosure, the MALT system comprises a transponder device that can be positioned at a specific location, such as a location where a delivery is to be made. The transponder device can be used to identify the location of an object or location not associated with an address or landmark. This is particularly useful for rural delivery locations that do not have a valid or determinable address. For example, the transponder device can be positioned on a mailbox or house where a delivery is to be made.

The transponder device can be a GPS transponder that transmits a signal to a receiver device. The transponder device can be positioned at a particular location, such as a storage facility, building or house, or on a particular object, such as a box or container. The receiver device can be a GPS-integrated smartphone with GPS tracking software. The transponder can be positioned at a location where an item is to be delivered. The receiver smartphone can be provided to a delivery person responsible for delivering the item. The transponder transmits a signal to the smartphone guiding the delivery person to the transponder.

The transponder can have an identifier number or signal that can be programmed into a device or a master server, or other designated application. The designated controller device or application programs the transponder to transmit a signal to one or more receiving devices such as a mobile phone or other device utilizing GPS capabilities.

The GPS transponder can serve as a guide to a specific box, package, location or object that may not have an association with a GPS address in a mapping application. The transponder can confirm the correct and appropriate match with a receiver device when identified. The transponder serves as a beacon/locator device for deliveries or pickup.

The system can be used by delivery personnel to facilitate delivery of an item. The system can be used by first responders, such as law enforcement officers, fire fighters and emergency medical personnel, to help them find a particular location. The system can be used in any circumstance to help locate a stationary structure or moveable object.

The GPS transponder can be physically attached to or built into devices, boxes, or objects. The transponder can be reusable, and added and removed for similar uses. The transponder can be disposable.

The transponder can be utilized to assist a delivery person locate a specific package or mailbox within a high-rise building or apartment. The transponder can be utilized to identify or locate a package, mailbox or location when weather or other conditions may interfere with GPS mapping satellites.

Once the transponder and the receiver establish a match, the transponder can be reprogrammed to match with other receivers. The transponder can be programmed to signal one or more receivers. The transponder utilizes GPS technology to assist in establishing a relationship with one or more receivers. The GPS transponder can be battery powered or hardwired if at a fixed location.

According to an embodiment of the disclosure, the system can be used to track the location of a package. The GPS transponder is fixed to the package, and transmits a signal to the receiver indicating the location of the package.

According to an embodiment of the disclosure, the system can include a container that is adapted to automatically open when the receiving device is within a specific range or proximity of the transponder.

According to an embodiment of the disclosure, an action is triggered when the receiver device (smartphone) comes within a certain range or proximity of the transponder. The action can be a text message provided to the smartphone, or the event can be access granted to the building where the transponder is located. Access can be granted by unlocking an electronic lock on door of the building.

In an alternative embodiment, the transponder may function outside of a GPS network and may be independent of GPS. The transponder utilizes a unique identifier network.

A secured delivery system and methods of using same are described above. Various changes can be made to the disclosure without departing from its scope. The above description of preferred embodiments of the disclosure is provided for the purpose of illustration only and not limitation.

The foregoing description comprises illustrative embodiments. Having thus described example embodiments, it should be noted by those skilled in the art that the within disclosures are example only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. An artificial intelligence entry management system comprising:
   an artificial intelligence entry management device comprising:
      a housing comprising:
         camera;
         a microphone;
         a speaker;

a controller;
a wireless communication device;
an access point comprising an electronic lock that is controlled by the controller to lock and unlock said access point;
an artificial intelligence device in communication with the artificial intelligence entry management device including a processor with a non-transitory computer readable storage medium comprising software having program instructions configured for providing artificial intelligence to the artificial intelligence entry management device;
a robot having a wireless signal transceiver that communicates with the controller of the artificial intelligence entry management device;
wherein, the artificial intelligence entry management device is configured to work on a networkable platform with networked software accessible and interactive with said artificial intelligence entry management device and member devices running the networked software and participating on the networkable platform, wherein the networkable platform is configured for communication between said member devices including member devices of owners, service personnel, property management, real estate professionals, short term rentals, hotels, and employees, wherein the networkable platform is configured to provide access and logistics to access points.

2. The artificial intelligence entry management system of claim 1, wherein the camera is adapted to read a virtual key, and upon verifying the virtual key, the software of the artificial intelligence device is configured to unlock said electronic lock to said access point.

3. The artificial intelligence entry management system of claim 2 wherein the software of the artificial intelligence device is configured to provide a logistic message via the speaker including directions to the access point.

4. The artificial intelligence entry management system of claim 3, robot comprises a robot speaker and wherein said logistic message is emitted by said robot speaker.

5. The artificial intelligence entry management system of claim 1, wherein the robot comprises a robot speaker and wherein said robots emits a contextual greeting from said robot speaker.

6. The artificial intelligence entry management system of claim 1, wherein the robot is configured to open said access point.

7. The artificial intelligence entry management system of claim 1, wherein the robot comprises a package manipulator configured to retain and release a package, wherein the robot is configured to move a package from a first location to a second location.

8. The artificial intelligence entry management system of claim 1, wherein the robot comprises a robot camera configured to take images.

9. The artificial intelligence entry management system of claim 8, wherein the robot comprises an artificial intelligence device that is configured to identify a package or a threat from an image taken by said robot camera, wherein the threat is a person.

10. The artificial intelligence entry management system of claim 8, wherein the robot is configured to take images of said threat and transmit said image of said threat to said artificial intelligence entry management system or an authority.

11. The artificial intelligence entry management system of claim 8, wherein the robot is configured to track the threat and configured to transmit a location of said threat to said artificial intelligence entry management system or an authority.

12. The artificial intelligence entry management system of claim 8, wherein the robot is configured to take an image of a vehicle said threat and is configured to transmit said image of the vehicle is transmitted to said artificial intelligence entry management system or an authority.

13. The artificial intelligence entry management system of claim 1, further comprising a docking station for said robot.

14. The artificial intelligence entry management system of claim 13, wherein the docking station comprises a charging port to charge a battery on the robot when said robot is docked on the docking station.

15. The artificial intelligence entry management system of claim 14, wherein the docking station comprises an interchangeable battery configured to be exchanged with a battery on the robot when said robot is docked on the docking station.

16. The artificial intelligence entry management system of claim 14, wherein the docking station receives power from a renewable power source.

17. The artificial intelligence entry management system of any of claim 13, wherein the docking station comprises a motion detector.

18. The artificial intelligence entry management system of claim 17, wherein the docking station is configured to monitor a substantial portion of a perimeter of a building having said access point, wherein at least 80% of the perimeter is monitored by said motion detector.

19. The artificial intelligence entry management system of any of claim 14, wherein the docking station comprises a speaker.

20. The artificial intelligence entry management system of claim 19, wherein the docking station is configured to emit an alarm.

21. The artificial intelligence entry management system of claim 20, wherein the docking station comprises a motion detector and wherein the alarm is emitted when motion above a threshold motion is detected by the motion detector.

22. The artificial intelligence entry management system of claim 1, comprising a plurality of robots and a plurality of docking stations, wherein the plurality of robots are configured to dock on said docking stations, wherein the docking stations are configured around a building configured on a property and wherein the property comprises said access point and wherein the plurality of robots each comprise a robot camera that is configured to take images, wherein the plurality of robots are configured to monitor a substantial portion of a perimeter of the building, wherein at least 80% of the perimeter is monitored by said cameras on said plurality of robots.

23. The artificial intelligence entry management system of claim 22, wherein each of the plurality of robots comprise a microphone that is configured to record sounds.

24. The artificial intelligence entry management system of claim 22, wherein the robot comprising a controller and wherein the robot acts autonomously from the entry management device to monitor a perimeter around a building.

25. The artificial intelligence entry management system of claim 22, wherein each of the plurality robots comprise a speaker that is configured to emit an alarm when a threat is detected.

26. The artificial intelligence entry management system of claim 22, wherein each of the plurality robots comprise a light that is configured to turn on when a threat is detected.

27. The artificial intelligence entry management system of claim 22, wherein a first robot of the plurality of robots communicates a location of said first robot with a second robot of the plurality of robots to follow a threat.

28. The artificial intelligence entry management system of claim 27, wherein the plurality of robots are aerial robots that follow a threat and form a robot swarm around said threat.

29. The artificial intelligence entry management system of claim 1, further comprising a mobile device that interfaces with the artificial intelligence entry management system, and wherein the mobile device is configured to activate the robot to monitor a substantial portion of a perimeter.

30. The artificial intelligence entry management system of claim 29, wherein the robot is configured to conduct surveillance routes from the docking station.

31. The artificial intelligence entry management system of claim 1, wherein the robot comprises a deterrent device.

32. The artificial intelligence entry management system of claim 1, wherein the robot deterrent device is a pepper sprayer.

33. The artificial intelligence entry management system of claim 32, wherein the robot comprises a weapon selected from the group consisting of a gun, knife or spear.

* * * * *